(12) United States Patent
Hozumi et al.

(10) Patent No.: US 9,356,279 B2
(45) Date of Patent: May 31, 2016

(54) ELECTRODE BODY, METHOD FOR PRODUCING ELECTRODE BODY, AND BATTERY PROVIDED WITH ELECTRODE BODY

(71) Applicants: Masato Hozumi, Susono (JP); Toshiya Saito, Susono (JP); Hideto Yamada, Tsukuba (JP); Tohru Suzuki, Tsukuba (JP); Tetsuo Uchikoshi, Tsukuba (JP); Yoshio Sakka, Tsukuba (JP)

(72) Inventors: Masato Hozumi, Susono (JP); Toshiya Saito, Susono (JP); Hideto Yamada, Tsukuba (JP); Tohru Suzuki, Tsukuba (JP); Tetsuo Uchikoshi, Tsukuba (JP); Yoshio Sakka, Tsukuba (JP)

(73) Assignees: TOYOTA JIDOSHA KABUSHIKI KAISHA, Toyota (JP); NATIONAL INSTITUTE FOR MATERIALS SCIENCE, Ibaraki (JP)

(*) Notice: Subject to any disclaimer, the term of this patent is extended or adjusted under 35 U.S.C. 154(b) by 380 days.

(21) Appl. No.: 13/956,608

(22) Filed: Aug. 1, 2013

(65) Prior Publication Data
US 2014/0038055 A1    Feb. 6, 2014

(30) Foreign Application Priority Data
Aug. 3, 2012  (JP) ................. 2012-172733

(51) Int. Cl.
| | |
|---|---|
| H01M 4/04 | (2006.01) |
| H01M 4/131 | (2010.01) |
| H01M 4/1391 | (2010.01) |
| H01M 10/052 | (2010.01) |

(52) U.S. Cl.
CPC .......... *H01M 4/0402* (2013.01); *H01M 4/0485* (2013.01); *H01M 4/131* (2013.01); *H01M 4/1391* (2013.01); *H01M 10/052* (2013.01); *Y02E 60/122* (2013.01)

(58) Field of Classification Search
CPC . Y02E 60/122; H01M 4/0402; H01M 4/0485
USPC ................. 429/223, 209, 231.3; 427/550
See application file for complete search history.

(56) References Cited

U.S. PATENT DOCUMENTS

| | | | |
|---|---|---|---|
| 2010/0279176 A1 | 11/2010 | Ogawa et al. | |
| 2011/0298336 A1* | 12/2011 | Saito et al. ........ | H01M 4/40402 429/223 |
| 2012/0027919 A1 | 2/2012 | Takahashi et al. | |

FOREIGN PATENT DOCUMENTS

| | | |
|---|---|---|
| JP | A-2012-99405 | 5/2012 |
| WO | WO 2007/052803 A1 | 5/2007 |
| WO | WO 2010/021205 A1 | 2/2010 |

*Primary Examiner* — Mark F Huff
*Assistant Examiner* — Monique Wills
(74) *Attorney, Agent, or Firm* — Oliff PLC

(57) ABSTRACT

In a (001) pole figure of the active material particles, where a plane parallel to the substrate is defined as the equatorial plane, a Lotgering factor $f_a(001)$ of an A plane and a Lotgering factor $f_b(001)$ of a B plane satisfy both Expressions (1) and (2) below, the A plane being an equatorial cross section perpendicular to a line that connects the center of the (001) pole figure and a first point of maximum XRD intensity of peaks attributed to (001) planes at the outer periphery of the equatorial plane, the B plane being an equatorial cross section perpendicular to a line that connects the center of the (001) pole figure and a second point of minimum XRD intensity of peaks attributed to the (001) planes at the outer periphery of the equatorial plane:

$f_a(001) > 0.3$          Expression (1)

$f_a(001) - f_b(001) < 1.0$          Expression (2).

8 Claims, 12 Drawing Sheets

F I G . 6
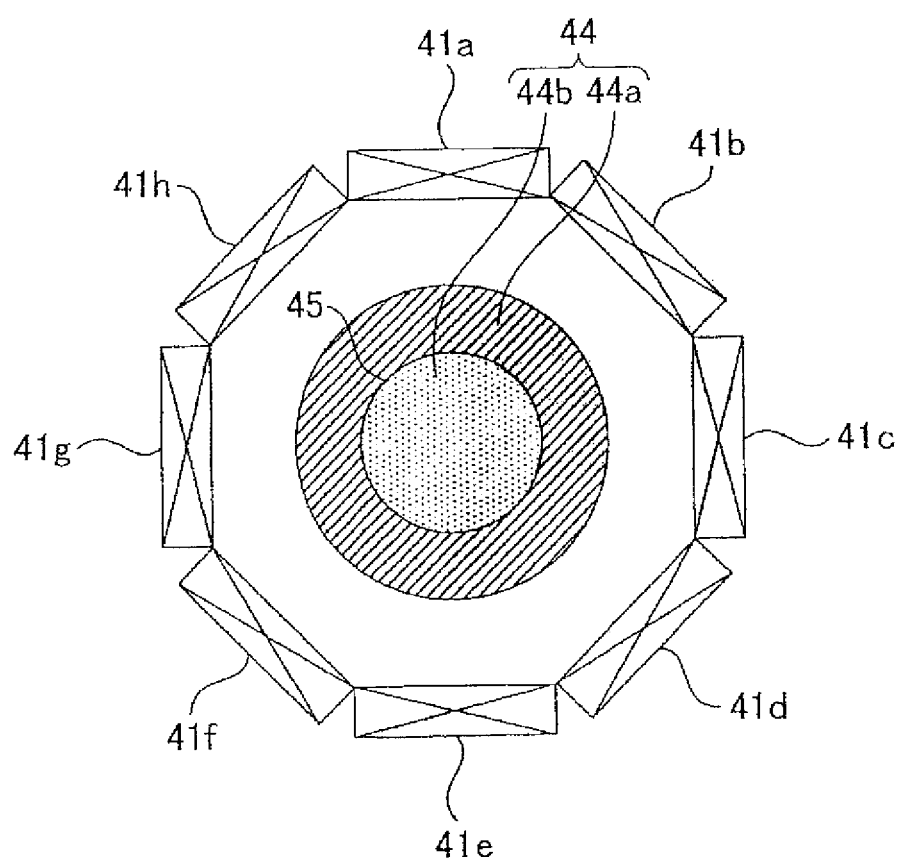

ELECTRODE BODY, METHOD FOR PRODUCING ELECTRODE BODY, AND BATTERY PROVIDED WITH ELECTRODE BODY

INCORPORATION BY REFERENCE

The disclosure of Japanese Patent Application No 2012-172733 filed on Aug. 3, 2012 including the specification, drawings and abstract is incorporated herein by reference in its entirety.

BACKGROUND OF THE INVENTION

1. Field of the Invention

The invention relates to an electrode body that, when used in a battery, allows increasing the discharge capacity of the battery beyond that of a conventional battery, while reducing voltage drops, and relates to a method for producing such an electrode body.

2. Description of Related Art

In secondary batteries, the decrement in chemical energy that accompanies a chemical reaction can be converted to electric energy, such that the battery can be discharged; also, electric energy can be converted to chemical energy and be charged in the battery by causing current to flow in a direction opposite to that during discharge. Among secondary batteries, secondary batteries typified by lithium secondary batteries exhibit high energy density, and hence are widely used as power sources in notebook personal computers, cell phones and the like.

A reaction represented by formula (I) below takes place in the negative electrode during discharge in a case where graphite (represented by C) is used as a negative electrode active material in a lithium secondary battery.

$$Li_xC_6 \rightarrow 6C + xLi^+ + xe^- \text{(I)} \text{ (in formula (I), } 0 < x < 1)$$

The electrons generated in the reaction of formula (I) pass through an external circuit, perform work at an external load, and arrive to the positive electrode. The lithium ions (Li$^+$) that are generated in formula (I) move by electro-osmosis from the negative electrode towards the positive electrode through an electrolyte that is sandwiched between the negative electrode and the positive electrode.

The reaction represented by formula (II) below takes place in the positive electrode during discharge, in a case where lithium cobalt oxide ($Li_{1-x}CoO_2$) is used as the positive electrode active material.

$$Li_{1-x}CoO_2 + xLi^+ + xe^- \rightarrow LiCoO_2 \text{(II)} \text{ (in formula (II), } 0 < x < 1)$$

During charging, reverse reactions to those of formula (I) and formula (II) take place in the negative electrode and the positive electrode, respectively, so that in the negative electrode, graphite into which lithium is incorporated ($Li_xC_6$) is regenerated through graphite intercalation, and lithium cobalt oxide ($Li_{1-}CoO_2$) is regenerated in the positive electrode. Re-discharge is made possible thereby.

$LiCoO_2$ that is used as a positive electrode active material in an all-solid-state lithium secondary battery has a strong tendency to exhibit c-axis orientation when made into a thin film, and hence exchange of lithium ions between the positive electrode active material and a solid electrolyte does not take place smoothly, and the output current of the all-solid-state lithium secondary battery decreases as a result. With a view to solving such a problem, Japanese Patent Application Publication No. 2012-099405 (JP 2012-099405 A) discloses a technology for tilting the c-axis in a lithium cobalt oxide crystal obliquely with respect to the normal of a substrate. This technology relies on a sintered compact that is provided with a conductive substrate and with an orientation layer that is formed through magnetic orientation, on at least one surface of the conductive substrate, wherein the orientation layer is made up of spherical particles of lithium cobalt oxide ($LiCoO_2$), and the c-axis of the lithium cobalt oxide is oriented in a predetermined direction that is oblique, by a predetermined angle or more, with respect to the normal direction of the conductive substrate.

SUMMARY OF THE INVENTION

Results of studies by the inventors have shown that a lithium battery that utilizes a sintered compact that is oriented through alignment of the c-axis of lithium cobalt oxide in a given direction, for instance the lithium battery disclosed in JP 2012-099405 A, exhibits low discharge capacity, as in Comparative Example 4 described below, which is problematic. in view of the above, it is an object of the invention to provide an electrode body that, when used in a battery, allows increasing the discharge capacity of the battery beyond that of a conventional battery, while reducing voltage drops, and to provide a method for producing the electrode body.

The electrode body is provided with a substrate and an alignment layer on at least one surface of the substrate. The orientation layer includes active material particles having a crystal structure exhibiting highest ion conductivity in a direction perpendicular to a <001>direction, such that, in a (001) pole figure relating to the active material particles in the orientation layer and where a plane parallel to the substrate is defined as the equatorial plane, a Lotgering factor $f_a(001)$ of an A plane and a Layering factor $f_b(001)$ of a B plane satisfy both Expressions (1) and (2) below, the A plane being an equatorial cross section perpendicular to a line that connects the center of the (001) pole figure and a point of maximum X-ray diffraction (XRD) intensity of peaks attributed to (001) planes at the outer periphery of the equatorial plane, the B plane being au equatorial cross section perpendicular to a line that connects the center of the (001) pole figure and a point of minimum XRD intensity of peaks attributed to the (001) planes at the outer periphery of the equatorial plane.

$$f_a(001) > 0.3 \qquad \text{Expression (1)}$$

$$f_a(001) - f_b(001) < 1.0 \qquad \text{Expression (2)}$$

The method for producing an electrode body has: a preparation process of preparing a substrate and active material particles having a crystal structure that exhibits highest ion conductivity in a direction perpendicular to a <001> direction; and an electrode body production process of layering a layer including the active material particles onto the substrate while applying a magnetic field in a direction substantially parallel to the substrate, and relatively rotating the direction of the magnetic field with respect to the substrate about an axis that is substantially perpendicular to the substrate, to thereby produce an electrode body in which the substrate has formed thereon an orientation layer configured such that, in a (001) pole figure of the active material particles and where a plane parallel to the substrate is defined as the equatorial plane, a Lotgering factor L(001) of an A plane and a Lotgering factor $f_b(001)$ of a B plane satisfy both Expressions (1) and (2) below, the A plane being an equatorial cross section perpendicular to a line that connects the center of the (001) pole figure and a point of maximum XRD intensity of peaks attributed to (001) planes at the outer periphery of the equatorial plane, the B plane being an equatorial cross section perpendicular to a line that connects the center of the (001) pole figure and a point of minimum XRD intensity of peaks attributed to the (001) planes at the outer periphery of the equatorial plane.

$$f_a(001) > 0.3 \quad \text{Expression (1)}$$

$$f_a(001) - f_b(001) < 1.0 \quad \text{Expression (2)}$$

In the aspect of the invention, $f_a(001)$ satisfies Expression (1), and as a result directions of high ion conductivity are rendered substantially perpendicular to the substrate; also, $f_a(001)$ and $f_b(001)$ satisfy Expression (2), and as a result active material particles in the orientation layer are disposed in such a manner that the expansion and contraction directions of the active material particles derived from ion entry and exit are random with respect to one another. When the above electrode body is built into a battery, it becomes possible as a result to enhance the discharge capacity of the battery, to make voltage drops lower than in conventional batteries, and to further suppress breakage of the orientation layer.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 6 is a schematic diagram illustrating a fourth embodiment of an electrode body production process;

DETAILED DESCRIPTION OF EMBODIMENTS

Figure 1A:
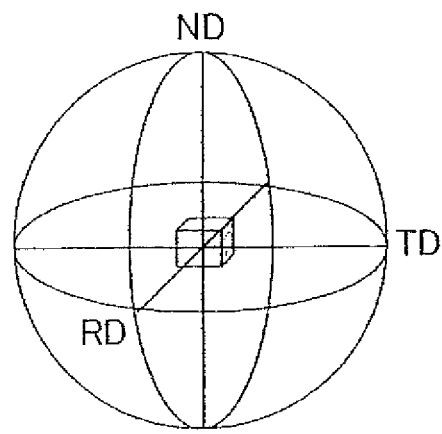
FIG. 1A is a schematic diagram in which a microcrystal in a polycrystalline sample, such that the c-axis direction of the microcrystal is parallel to a substrate and c-axes are random with respect to one another, is placed at the center of a sphere having (reference direction (RD), transverse direction (TD), normal direction (ND)) coordinates.

The electrode body is provided with a substrate and with an orientation layer on at least one surface of the substrate. The orientation layer includes active material particles having a crystal structure exhibiting highest ion conductivity in a direction perpendicular to a <001> direction, such that, in a (001) pole figure relating to the active material particles in the orientation layer and where a plane parallel to the substrate is defined as the equatorial plane, a Lotgering factor $f_a(001)$ of an A plane and a Lotgering factor $f_b(001)$ of a B plane satisfy both Expressions (1) and (2) below, the A plane being an equatorial cross section perpendicular to a line that connects the center of the (001) pole figure and a point of maximum XRD intensity of peaks attributed to (001) planes at the outer periphery of the equatorial plane, the B plane being an equatorial cross section perpendicular to a line that connects the center of the (001) pole figure and a point of minimum XRD intensity of peaks attributed to the (001) planes at the outer periphery of the equatorial plane.

$$f_a(001) > 0.3 \quad \text{Expression (1)}$$

$$f_a(001) - f_b(001) < 1.0 \quad \text{Expression (2)}$$

Conventional sintered compacts that are produced through coating of a substrate with active material particles, and sintering of the whole without modification, exhibit high energy density when used in batteries, but are problematic in terms of suffering from both low conductivity and low discharge capacity. This can be attributed to the fact that the directions in which ion conduction is fast are not aligned among active material particles. Meanwhile, sintered compacts that are oriented through alignment of the c-axis in a predetermined direction among active material particles, such as the one disclosed in JP 2012-099405 A described above, have significant problems when used in a battery, namely lowered discharge capacity and voltage drop (IR drop) upon charge and discharge. The above shortcomings are deemed to arise from the fact that the directions of expansion and contraction of active material particles, which occur upon storage and release of ions, become aligned through alignment of the c-axis directions among active material particles, so that, as a result, the active material particles impart stress to one another upon every charge and every discharge.

The inventors found that both high discharge capacity and suppression of IR drops can be achieved by controlling the orientation direction of active material particles in the electrode body, by aligning the directions of fast lithium conduction in the active material particles, and by imparting randomness to the directions of expansion and contraction of the active material particles. The inventors found that discharge capacity can be enhanced, stress arising from expansion and contraction that accompanies charge and discharge can be relieved, and IR drops can be suppressed, and, accordingly, rate characteristics as well can be enhanced, when the battery utilizes an electrode body such that a maximum value and a minimum value of Lotgefing factors at the outer periphery of the equatorial plane of a (001) pole figure satisfy both Expression (1) and Expression (2), and perfected the invention on the basis of that finding.

The electrode body is provided with the substrate and the orientation layer. The orientation layer and the substrate are explained below in turn, The orientation layer is provided on at least one surface of the substrate, and has active material particles. The active material particles have a crystal structure exhibiting highest ion conductivity in a direction perpendicular to a <001> direction. Herein, the <001> direction is a direction that collectively denotes a [001] direction (i.e. a +c-axis direction), and a [00-1] direction (i.e. a -c-axis direction) that are mutually equivalent surface directions. Preferably, the active material particles have magnetic orientability.

Preferably, the active material particles are lithium cobalt oxide ($LiCoO_2$) particles, lithium nickel oxide ($LiNiO_2$) particles, lithium nickel manganese oxide ($LiNi_{1/2}Mn_{1/2}O_2$) particles or lithium nickel manganese cobalt oxide ($LiNi_{1/3}Mn_{1/3}Co_{1/3}O_2$) particles. The active material particles have low ion conductivity in the <001> direction and highest ion conductivity in a direction that is perpendicular to the <001> direction.

The active material particles may be used singly as one type alone, or as two or more types.

A pole figure is a diagram that results from plotting the positions at which normal vectors of predetermined crystal planes on the surface of a sample, which is placed in the center of a virtual sphere, intersect the surface of the sphere, such that the distribution of the plots is depicted in the form of contour lines on the surface of the sphere. Pole figures are used to describe the orientation state of molecular directions and crystal planes in a crystal. In the (001) pole figure in the invention the plane parallel to the substrate is defined as the equatorial plane. Accordingly, the (001) pole figure of the invention corresponds to the pole figure of an RD-TD plane, where ND denotes the coordinate of a normal direction with respect to the substrate, and TD and RD each denote the coordinate of a direction parallel to the substrate. The method for calculating the (001) pole figure in the invention is not particularly limited. Examples of the (001) pole figure of the invention include, for instance, a (001) pole figure calculated through mapping according to EBSD in which there is measured the orientation of a micro-region, on the basis of a Kikuchi pattern obtained by electron beam backscattering, or a (001) pole figure calculated from XRD measurement results.

Figure 9:
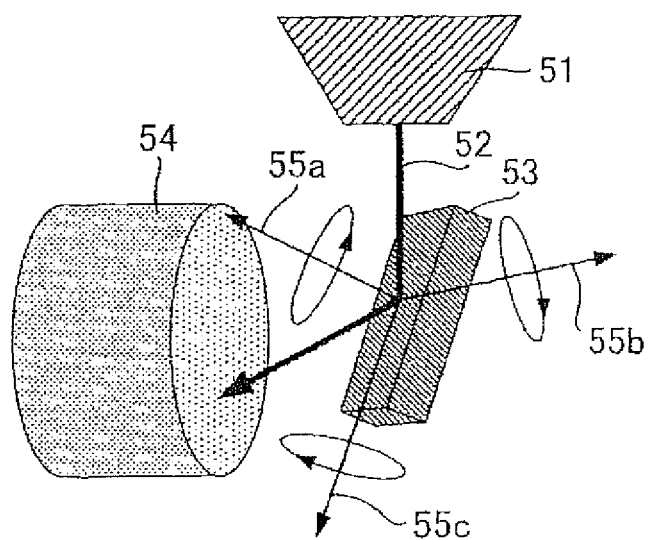
FIG. 9 is a perspective-view schematic diagram illustrating an outline of measurements by electron backscattering diffraction (EBSD)

FIG. 9 is a perspective-view schematic diagram illustrating an outline of measurement by EBSD. An electron beam 52 is irradiated, by an electron beam generating device 51, onto the measurement surface (orientation layer-side surface in the present embodiment) of an electrode body sample 53. A Kikuchi pattern generated through electron beam backscattering diffraction is projected onto a phosphor screen 54, is captured by a TV camera or the like, and is indexed. The crystal orientations of the resulting irradiation points are measured. The obtained distribution of the crystal orientation of the crystal grains can be represented by way of a pole figure.

The Lotgering factor f is worked out on the basis of Expression (A) below, using the peak intensities of X-rays diffracted from the target crystal planes.

$$f=(\rho-\rho_0)/(1-\rho_0) \quad \text{Expression (A)}$$

In the above Expression (A), $\rho_0$ is calculated using the diffraction intensity ($I_0$) of X-rays of an unoriented sample. In a case, for instance, of c-axis orientation, $\rho_0$ is worked out on the basis of Expression (B), as the total proportion of diffraction intensity of (001) planes (all planes perpendicular to the c-axis), with respect to the sum of all diffraction intensities.

$$\rho_0\{\Sigma I_0(001)\}/\{\Sigma I_0(hkl)\} \quad \text{Expression (B)}$$

(In Expression (B), $\Sigma I_0(hkl)$ is the sum of all X-ray diffraction intensities of the unoriented sample.)

In the above Expression (A), $\rho$ is calculated using the diffraction intensity (I) of X-rays of an oriented sample. In a case, for instance, of c-axis orientation, $\rho$ is worked out on the basis of Expression (C) that is similar to Expression (B), as the total proportion of diffraction intensity of (001) planes with respect to the sum of all diffraction intensities.

$$\rho=\{\Sigma I(001)\}/\{\Sigma I(hkl)\} \quad \text{Expression (C)}$$

(In Expression (C), $\Sigma I(hkl)$ is the sum of all X-ray diffraction intensities of the oriented sample.)

Expression (1) defines the strength of the (001) orientation of active material particles in the orientation layer.

$$f_a(001)>0.3 \quad \text{Expression (1)}$$

Herein, $f_a$ (001) being higher than 0.3 indicates that the c-axes of the active material particles are oriented within a plane parallel to the electrode surface. The active material particles have highest ion conductivity in a direction perpendicular to a <001> direction. Such being the case, the direction of high ion conductivity in an electrode body that satisfies Expression (1) is perpendicular to the substrate. Accordingly, a battery provided with the above electrode body exhibits excellent discharge capacity. Preferably, $f_a$(001) exceeds 0.4, and more preferably exceeds 0.5.

Expression (2) defines the randomness between active material particles in the orientation layer.

$$f_a(001)-f_b(001)<1.0 \quad \text{Expression (2)}$$

Herein, a difference between $f_a$(001) and $f_b$(001) being smaller than 1.0 indicates that the c-axes of active material particles in an electrode cross section are not concentrated in a specific cross section. In a case where an electrode body that satisfies Expression (2) is used in a battery, the expansion and contraction of the orientation layer upon charge and discharge are not concentrated in a specific direction, and it is deemed that, accordingly, the stress that active material particles exert one another in the orientation layer can be relieved, and the output of the battery is enhanced as a result. It is likewise deemed that in the battery provided with the above electrode body, stress acting on the electrodes as a whole can be relieved, and electrode breakage can be mitigated, so that, as a result, cycle characteristics are likewise enhanced. Preferably, the difference between $f_a(001)$ and $f_b(001)$ is smaller than 0.7, more preferably smaller than 0.5.

Figure 10A:
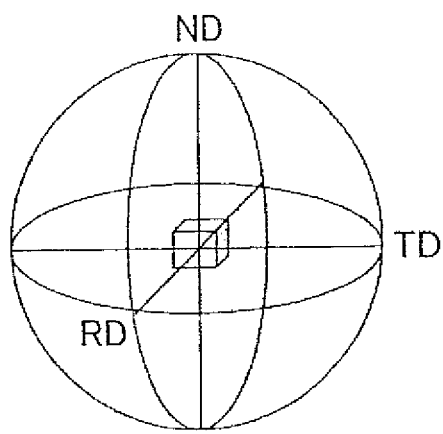
FIG. 10A is a schematic diagram in which a single-crystal sample is placed at the center of a sphere having (RD, TD, ND) coordinates.

A simplified example (FIGS. 10A to 12) of an electrode body that does not come under the invention and a simplified example of an electrode body that comes under the invention (FIG. 1) will be explained next. FIG. 10A is a schematic diagram in which a single-crystal sample is placed at the center of a sphere having (RD, TD, ND) coordinates.

Figure 10B:
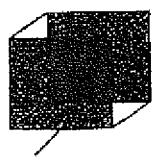
FIG. 10B is a perspective-view schematic diagram in which microcrystals have been isolated and lined up.
Figure 10C:
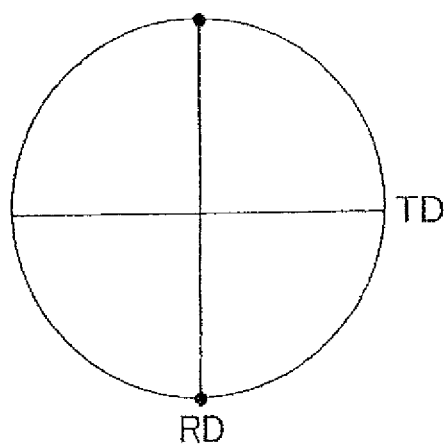
FIG. 10C is a (001) pole figure of a polycrystalline sample.

In FIG. 10A, the c-axis direction in the single-crystal sample overlaps with the RD-axis direction, FIG. 10B is a perspective-view schematic diagram of the above single-crystal sample. In FIG. 10B, the plane denoted by the arrow is the C-plane (plane perpendicular to the c-axis). FIG. 10C is a (001) pole figure (RD-TD plane) of the single-crystal sample. As illustrated in FIG. 10C, the (001) pole figure in the case of a single-crystal sample yields a plot with one point at either pole of the RD-axis. Such a single-crystal sample satisfies Expression (1), but not Expression (2).

Figure 11A:
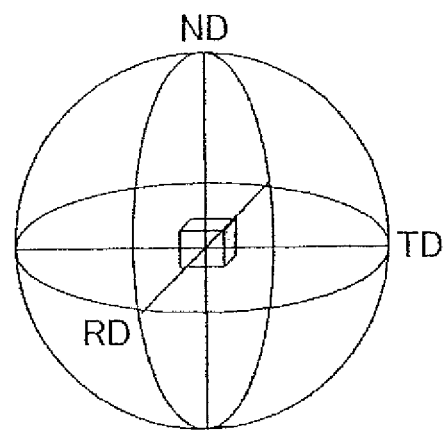
FIG. 11A is a schematic diagram in which a microcrystal of a polycrystalline sample having no orientability is placed at the center of a sphere having (RD, TD, ND) coordinates.
Figure 11B:
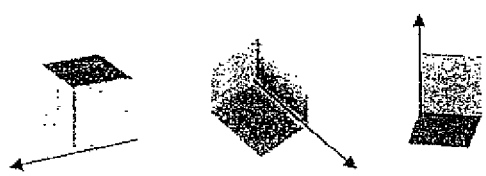
FIG. 11B is a perspective-view schematic diagram in which microcrystals have been isolated and lined up.
Figure 11C:
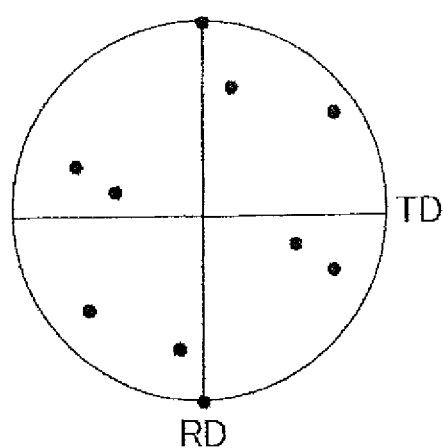
FIG. 11C is a (001) pole figure of a polycrystalline sample.

FIG. 11A is a schematic diagram in which a microcrystal of a polycrystalline sample having no orientability is placed at the center of a sphere having (RD, TD, ND) coordinates. FIG. 11B is a perspective-view schematic diagram in which microcrystals have been isolated and lined up. The arrows in FIG. 11B denote the c-axis direction in the respective microcrystals. As illustrated in FIG. 11B, the c-axis directions in the microcrystals are random with respect to one another, and the microcrystals have no orientability at all. FIG. 11C is a (001) pole figure of the polycrystalline sample. The c-axis directions of the microcrystals illustrated in FIG. 11B and the (001) pole figure in FIG. 11C do not necessarily correspond to each other. In the case of a polycrystalline sample having poor orientability, sparse plots appear within the RD-TD plane in the (001) pole figure, as illustrated in FIG. 11C. This polycrystalline sample having poor orientability satisfies Expression (2), but not Expression (1). Therefore, it is deemed that a battery that utilizes such a polycrystalline sample having poor orientability in an electrode active material layer will exhibit mitigated expansion and contraction of active material particles as a result of entry and exit of ions, but will exhibit low discharge capacity, since the directions of high ion conductivity are not aligned. Electrode bodies and batteries that utilize such a polycrystalline sample will be explained in detail in Comparative Example 1 and Comparative Example 3 below.

Figure 12A:
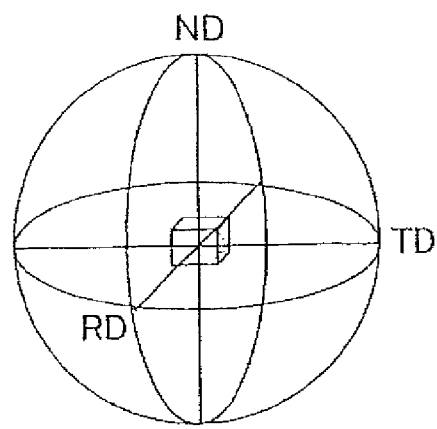
FIG. 12A is a schematic diagram in which a microcrystal in a polycrystalline sample, such that the c-axis direction of the microcrystal is aligned in a predetermined direction, is placed at the center of a sphere having (RD, TD, ND) coordinates.
Figure 12B:
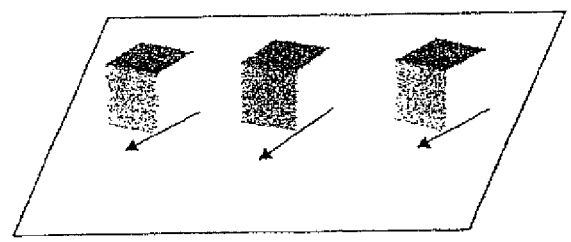
FIG. 12B is a perspective-view schematic diagram in which microcrystals have been isolated and lined up.
Figure 12C:
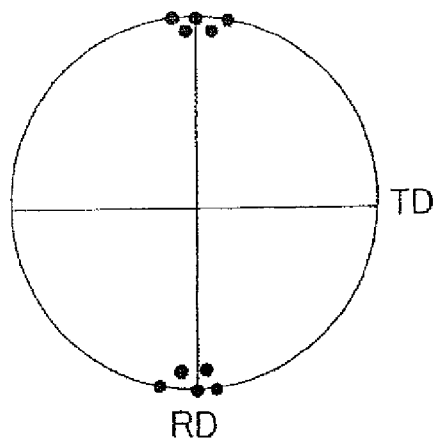
FIG. 12C is a (001) pole figure of a polycrystalline sample.

FIG. 12A is a schematic diagram in which a microcrystal in a polycrystalline sample, such that the c-axis direction of the microcrystal is aligned in a predetermined direction, is placed at the center of a sphere having (RD, TD, ND) coordinates. In FIG. 12A, the c-axis direction in the microcrystal overlaps substantially with the RD-axis direction. FIG. 12B is a perspective-view schematic diagram in which microcrystals have been isolated and lined up. The arrows in FIG. 12B denote the c-axis directions of respective microcrystals, and the large white parallelograms denote planes that are parallel to the RD-TD plane. As illustrated in FIG. 12B, the c-axis directions of is the microcrystals are parallel to the RD-TD plane, and are substantially aligned in a predetermined direction. FIG. 12C is a (001) pole figure of the polycrystalline sample. The c-axis directions of the microcrystals illustrated in FIG. 12B and the (001) pole figure in FIG. 12C do not necessarily correspond to each other. In the case of a polycrystalline sample having high orientability, plots concentrate at both poles of the RD-axis in the (001) pole figure, as illustrated in FIG. 12C. Such a polycrystalline sample having high orientability satisfies Expression (1), but not Expression (2). Therefore, it is deemed that a battery that utilizes polycrystalline sample made up of such microcrystals having high orientability in an electrode active material layer will exhibit low discharge capacity, since, although ion conductivity is high, the microcrystals undergo repeated expansion and contraction, as a result of ion entry and exit, in substantially mutually identical directions. Electrode bodies and batteries that utilize such a polycrystalline sample in the orientation layer will be explained in detail in Comparative Example 2 and Comparative Example 4 below.

Figure 1B:
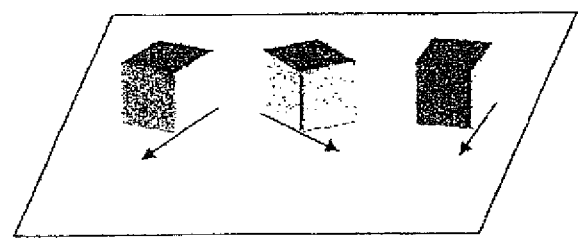
FIG. 1B is a perspective-view schematic diagram in which microcrystals have been isolated and lined up.
Figure 1C:
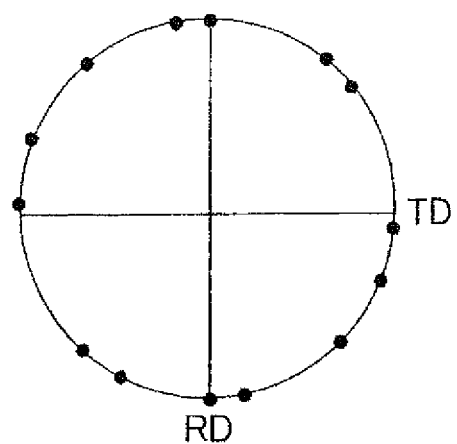
FIG. 1C is a (001) pole figure of a polycrystalline sample.

FIG. 1A is a schematic diagram in which a microcrystal in a polycrystalline sample, such that the c-axis direction of the microcrystal is parallel to a substrate and c-axes are random with respect to one another, is placed at the center of a sphere having (RD, TD, ND) coordinates. In FIG. 1A, the substrate is substantially parallel to the RD-TD plane. FIG. 1B is a perspective-view schematic diagram in which microcrystals have been isolated and lined up. The arrows in FIG. 1B denote the c-axis directions of respective microcrystals, and the large white parallelograms denote planes that are parallel to the RD-TD plane. The c-axis directions of the microcrystals are parallel to the RD-TD plane, but take on random directions with respect to one another, as illustrated in FIG. 1B. FIG. 1C is a (001) pole figure of the polycrystalline sample. The c-axis directions of the microcrystals illustrated in FIG. 1B and the (001) pole figure in FIG. 1C do not necessarily correspond to each other. As illustrated in FIG. 1C, plots are distributed at the outer periphery of the RD-TD plane in the case of a polycrystalline sample made up of microcrystals such that c-axis directions thereof are parallel to the RD-TD plane but such that the c-axes take on random directions with respect to one another. Such a polycrystalline sample having orientability satisfies both Expression (1) and Expression (2). Accordingly, it is deemed that a battery that utilizes such a polycrystalline sample having orientability will exhibit high discharge capacity and superior rate characteristics, since ion conductivity is excellent, and the directions of expansion and contraction in the microcrystal and that arise from ion entry and exit are random with respect to one another. Electrode bodies and batteries that utilize such a polycrystalline sample in the orientation layer will be explained in detail in Example 1 and Example 2 below.

The substrate is provided with the above-described orientation layer on at least one surface. The substrate is not particularly limited, so long as the substrate can provide a plane on which the orientation layer can be maintained in the form of a layer. The substrate may be a conductive substrate or a non-conductive substrate. Specifically, the substrate may have or lack conductivity if the substrate is used only in the production of the electrode body. In a case where the substrate is used also as a collector of the battery, then the substrate is preferably conductive. Examples of the substrate include, for instance, an aluminum substrate, an alumina substrate, a SUS substrate, a nickel substrate, an iron substrate, a titanium substrate, a glass substrate, a copper substrate, a solid electrolyte substrate and the like. A porous substrate may be used in the invention.

The electrode body may be used as a positive electrode of a battery, or as a negative electrode of a battery. Whether the electrode body is used as a positive electrode or as a negative electrode depends on the potential of the electrode active material that is used For instance, the above-described lithium cobalt oxide has a potential of 4 V with respect to the redox potential of lithium (potential of the reaction $Li^+ + e^- \rightarrow Li$, and of the reverse reaction). However, if lithium cobalt oxide is used in a battery in combination with an electrode active material that has a potential of 5 V with respect to the abovementioned redox potential, then lithium cobalt oxide is used as a negative electrode active material, and the electrode active material having the abovementioned 5 V potential is used as the positive electrode active material. In a case where lithium cobalt oxide is used in a battery in combination with carbon, then lithium cobalt oxide is used as the positive electrode active material, and carbon is used as the negative electrode active material. The electrode body may be a positive electrode or a negative electrode of a lithium battery.

The battery is a battery provided with at least a positive electrode, a negative electrode, and an electrolyte layer that is interposed between the positive electrode and the negative electrode, wherein at least either one of the positive electrode and the negative electrode is provided with the above electrode body.

Figure 2:
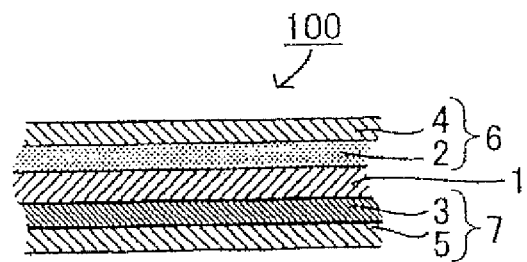
FIG. 2 is a diagram illustrating schematically an example of the layer build-up of a battery according to the invention, being a diagram illustrating schematically a cross section resulting from cutting the battery in a stacking direction.

FIG. 2 is a diagram illustrating an example of the layer build-up of a battery, being a diagram that illustrates schematically a cross section resulting from cutting the battery in a stacking direction. The battery according to the invention is not necessarily limited to that example alone. The battery 100 has: a positive electrode 6 provided with a positive electrode active material layer 2 and a positive electrode collector 4; a negative electrode 7 provided with a negative electrode active material layer 3 and a negative electrode collector 5; and an electrolyte layer 1 sandwiched between the positive electrode 6 and the negative electrode 7. The positive electrode and/or negative electrode in the battery according to the invention is/are provided with the above-described electrode body. In a preferred embodiment of positive electrode provided with the above-described electrode body, the orientation layer in the above-described electrode body constitutes the positive electrode active material layer, and the substrate constitutes the positive electrode collector. In a preferred embodiment of the negative electrode provided with the above-described electrode body, the orientation layer in the above-described electrode body constitutes the negative electrode active material layer, and the substrate constitutes the negative electrode collector. The positive electrode, negative electrode and electrolyte layer that make up the battery according to the invention, as well as a separator and a battery case that are suitably used in the invention, are explained in detail below.

A positive electrode that is provided with the abovementioned electrode body is as described above. Preferably, a positive electrode lead of the positive electrode provided with the electrode body is connected to the substrate. A positive electrode that is not provided with the above-described electrode body is explained below. The conditions of the positive electrode below are assumed to be applicable to the abovementioned electrode body, so long as the conditions are not at variance with those of abovementioned electrode body. Preferably, the positive electrode of the battery according to the invention is provided with a positive electrode active material layer including a positive electrode active material, and is ordinarily provided also, in addition, with a positive electrode collector, and with a positive electrode lead that is connected to the positive electrode collector.

Specific examples of the positive electrode active material include, for instance, $LiCoO_2$, $LiNiO_2$, $LiNi_{1/2}Mn_{1/2}O_2$, $LiNi_{1/3}Mn_{1/3}Co_{1/3}O_2$, $LiNiPO_4$, $LiMnPO_4$, $Li_3Fe_2(PO_4)_3$ and $Li_3V_2(PO_4)_3$. Olivine-based active materials exhibit fast ion conduction in the (010) direction. In this case, an identical effect can be expected to be elicited by imparting orientation in such a manner that the (010) directions are aligned. Among such active materials, $LiCoO_2$ is preferably used as the positive electrode active material in the invention.

The thickness of the positive electrode active material layer can be appropriately adjusted in accordance with, for instance, the intended use of the battery. The thickness of the positive electrode active material layer is preferably 0.5 μm or greater, more preferably 1 μm or greater. The thickness of the positive electrode active material layer is preferably 250 μm or smaller, more preferably 200 μm or smaller, and yet more preferably 150 μm or smaller.

The average particle size of the positive electrode active material is preferably 0.01 μm or greater, more preferably 0.05 μm or greater, and yet more preferably 0.1 μm or greater. The average particle size of the positive electrode active material is preferably 100 μm or smaller, more preferably 50 μm or smaller and yet more preferably 30 μm or smaller. That is because handleability may decrease if the average particle size of the positive electrode active material is excessively small, while it may be difficult to obtain a flat positive electrode active material layer if the average particle size of the positive electrode active material is excessively large. The average particle size of the positive electrode active material can be worked out, for instance, by measuring and averaging the particle size of an active material carrier that is observed by scanning electron microscopy (SEM).

The positive electrode active material layer may contain a conductive material, a binder and so forth, as needed. The conductive material in the positive electrode active material layer is not particularly limited, so long as it allows enhancing the conductivity of the positive electrode active material layer. Examples thereof include, for instance, carbon black such as acetylene black, Ketjen black and the like. The content of conductive material in the positive electrode active material layer varies depending on the type of the conductive material, but ranges ordinarily from 0 to 10 mass %.

Examples of the binder in the positive electrode active material layer include, for instance, polyvinylidene fluoride (PVDF), parytetrafluoroethylene (PETE) and the like. It suffices that the binder in the positive electrode active material layer be present in an amount that allows immobilizing the positive electrode active material, but is preferably lower than that. The content of binder ranges ordinarily from 0 to 10 mass %.

The positive electrode active material layer may contain a positive electrode electrolyte. In this case, a sulfide-based solid electrolyte, an oxide-based solid electrolyte, a polymer electrolyte or the like, or a gel electrolyte or the like, which are described below, can be used as the positive electrode electrolyte.

The positive electrode collector has the function of collecting power from the positive electrode active material layer. Examples of the material of the positive electrode collector include, for instance, aluminum, SUS, nickel, iron, titanium and the like, preferably aluminum and SUS among the foregoing. Examples of the shape of the positive electrode collector include, for instance, a foil shape, a plate shape, a mesh shape and the like, preferably a foil shape among the foregoing.

The method for producing the positive electrode is not particularly limited, so long as it is a method that allows obtaining the positive electrode. After formation of the positive electrode active material layer, the positive electrode active material layer may be pressed in order to enhance electrode density.

A negative electrode that is provided with the abovementioned electrode body is as described above. Preferably, a negative electrode lead of the negative electrode provided with the electrode body is connected to the substrate. A negative electrode that is not provided with the above-described electrode body is explained below. The conditions of the negative electrode below are assumed to be applicable to the abovementioned electrode body, so long as the conditions are not at variance with those of abovementioned electrode body. Preferably, the negative electrode of the battery according to the invention is provided with a negative electrode active material layer including a negative electrode active material, and is ordinarily provided also, in addition, with a negative electrode collector, and with a negative electrode lead that is connected to the negative electrode collector.

The negative electrode active material layer contains a negative electrode active material that has a metal, an alloy material, and/or a carbon material. Specific examples of the metal and alloy material that can be used in the negative electrode active material include, for instance, alkali metals such as lithium, sodium, potassium and the like; group-2 elements such as magnesium, calcium or the like; group-13 elements such as aluminum and the like; transition metals such as zinc, iron and the like; and alloy materials and compounds that contain the foregoing metals, Examples of the carbon material that can be used in the negative electrode active material include, for instance, graphite and the like. The negative electrode active material may be a powder-like material, or a thin-film-like material. Examples of compounds that contain lithium include, for instance, lithium alloys, oxides that contain lithium, nitrides that contain lithium, and sulfides that contain lithium. Examples of lithium alloys include, for instance, lithium aluminum alloys, lithium tin alloys, lithium lead alloys, lithium silicon alloys and the like. Examples of oxides that contain lithium include, for instance, lithium titanium oxides and the like. Examples of nitrides that contain lithium include, for instance, lithium cobalt nitride, lithium iron nitride, lithium manganese nitride and the like. Lithium coated with a solid electrolyte can also be used in the negative electrode layer.

The abovementioned negative electrode active material layer may contain a negative electrode active material alone, or may contain, in addition to the negative electrode active material, at least one from among a conductive material and a binder. In a case where, for instance, the negative electrode active material is foil-like, the negative electrode layer may be set to contain the negative electrode active material alone. In a case where the negative electrode active material is in powder form, the negative electrode layer may be set to have a negative electrode active material and a binder. Features relating to the conductive material and the binder are identical to those of the above-described conductive material and binder that are used in the positive electrode active material layer. The thickness of the negative electrode active material layer is not particularly limited. The thickness of the negative electrode active material layer is preferably 0.1 μm or greater, more preferably 0.5 μm or greater, and yet more preferably 1 μm or greater. The thickness of the negative electrode active material layer is preferably 250 μm or smaller, more preferably 200 μm or smaller, and yet more preferably 150 μm or smaller.

The negative electrode active material layer may contain a negative electrode electrolyte. In this case, a sulfide-based solid electrolyte, an oxide-based solid electrolyte, a polymer electrolyte or the like, or a gel electrolyte or the like, described below, can be used as the negative electrode electrolyte, As the material of the negative electrode collector there can be used materials identical to those of the positive electrode collector in the positive electrode according to the invention described above. The shape of the negative electrode collector may be the same as that of the positive electrode collector in the positive electrode according to the invention described above.

The method for producing the negative electrode is not particularly limited, so long as it is a method that allows obtaining the negative electrode. After formation of the negative electrode active material layer, the negative electrode active material layer may be pressed in order to enhance electrode density.

The electrolyte layer in the battery is held between the positive electrode and the negative electrode, and has the function of exchanging metal ions between the positive electrode and the negative electrode. An electrolyte solution, a gel electrolyte, a solid electrolyte or the like can be used in the electrolyte layer. The foregoing may be used singly as one type, or in the form of combinations of two or more types.

A nonaqueous electrolyte solution or an aqueous electrolyte solution can be used as the electrolyte solution. Preferably, the type of the nonaqueous electrolyte solution is appropriately selected in accordance with the type of metal ions that are to be conducted. For instance, a nonaqueous electrolyte solution that contains a lithium salt and a nonaqueous solvent is ordinarily used as a nonaqueous electrolyte solution that is utilized in lithium batteries. Examples of the lithium salt include, for instance, inorganic lithium salts such as $LiPF_6$, $LiBF_4$, $LiClO_4$, $LiAsF_6$ and the like; and organolithium salts such as $LiCF_3SO_3$, $LiN(SO_2CF_3)_2$(Li-TFSA), $LiN(SO_2C_2F_5)_2$ and $LiC(SO_2CF_3)_3$. Examples of the nonaqueous solvent include, for instance, ethylene carbonate (EC), propylene carbonate (PC), dimethyl carbonate (DMC), diethyl carbonate (DEC), ethyl methyl carbonate (EMC), ethyl carbonate, butylene carbonate, γ-butyrolactone, sulfolane, acetonitrile (AcN), dimethoxymethane, 1,2-dimethoxyetbane (DME), 1,3-climethoxypropane, diethyl ether, tetraethylene glycol dimethyl ether (TEGDME), tetrahydrofuran, 2-methyltetrahydrofuran, dimethyl sulfoxide (DMSO) and the like, as well as mixtures of the foregoing. The concentration of the lithium salt in the nonaqueous electrolyte ranges for instance from 0.5 to 3 mol/L.

A low-volatility liquid such as a ionic liquid, typified for instance by N-methyl-N-propylpiperidinium his(trifluoromethanesulfonypainide (PP13TFSA), N-methyl-N-propylpyrrolidinitun bis(trifluoromethanesulfonyl)amide (P13TFSA), N-butyl-N-methylpyrrolidinium bis(trifluoromethanesulfonyi)amide (P14TFSA), N,N-diethyl-N-methyl-N-(2-methoxyethyl)ammonium bis(trifluoromethanesulfonyl)amide (DEMETFSA), and N,N,N-trimethyl-N-propylammonium bis(trifluorornethanesulfonyl)amide (TMPATFSA) may be used as the nonaqueous electrolyte solution or nonaqueous solvent of the invention.

Preferably, the type of the aqueous electrolyte solution is appropriately selected in accordance with the type of metal ions that are to be conducted. For instance, an aqueous electrolyte solution that contains a lithium salt and water is ordinarily used as an aqueous solution electrolyte solution that is utilized in lithium batteries. Examples of lithium salts include, for instance, LiOH, LiCl, $LiNO_3$, $CH_3CO_2Li$ and the like.

The gel electrolyte is ordinarily a gelled product resulting from adding a polymer to a nonaqueous electrolyte solution. For instance, a nonaqueous gel electrolyte of a lithium battery can be obtained through gelling by adding a polymer such as polyethylene oxide, polypropylene oxide, polyacrylonitrile, polyvinylidene fluoride (PVDF), polyurethanes, polyacrylates, cellulose or the like to the above-described nonaqueous electrolyte solution. Preferred in the invention is a LiTFSA (LiN(CF$_3$SO$_2$)$_2$)-PEO nonaqueous gel electrolyte. Examples of solid electrolytes include, for instance, sulfide-based solid electrolytes, oxide-based solid electrolytes, polymer electrolytes and the like. Specific examples of sulfide-based solid electrolytes include, for instance, Li$_2$S-P$_2$S$_5$, Li$_2$S-P$_2$S$_3$, Li$_2$S-P$_2$S$_3$-P$_2$S$_5$, Li$_2$S-SiS$_2$, Li$_2$S-Si$_2$S, Li$_2$S-B$_2$S$_3$, Li$_2$S-GeS$_2$, LiI-Li$_2$S-P$_2$S$_5$, Li$_2$S-SiS$_2$-Li$_4$SiO$_4$, Li$_2$S-SiS$_2$-Li$_3$PO$_4$, Li$_3$PS$_4$-Li$_4$GeS$_4$, Li$_{3.4}$P$_{0.6}$Si$_{0.4}$S$_4$, Li$_{3.25}$P$_{0.2}$Ge$_{0.76}$S$_4$Li$_{4-x}$Ge$_{1-x}$P$_x$S$_4$ and the like. Specific examples of oxide-based solid electrolytes include, for instance, UPON (lithium phosphate oxynitride), Li$_{1.3}$Al$_{0.3}$Ti$_{0.7}$(PO$_4$)$_3$, La$_{0.51}$Li$_{0.34}$TiO$_{0.74}$, Li$_3$PO$_4$, Li$_2$SiO$_2$, Li$_2$SiO$_4$ and the like. A garnet-type solid electrolyte can be used in the invention. Examples of garnet-type solid electrolytes include, for instance, Li$_{5+x}$La$_3$(Zr$_x$, Nb$_{2-x}$)O$_{12}$(x=0 to 2), Li$_5$La$_3$Ta$_2$O$_{12}$, Li$_6$BaLa$_2$Ta$_2$O$_{12}$ and the like. The polymer electrolyte contains ordinarily a metal salt and a polymer. A lithium salt can be used as the metal salt in a case where the battery according to the invention is a lithium battery. At least one type from among the above-described inorganic lithium salts and organolithium salts can be used as the lithium salt. The polymer is not particularly limited, so long as it forms complexes with lithium salts. Examples thereof include, for instance, polyethylene oxide and the like.

The battery may be provided with a separator that is impregnated with the above-described electrolyte solution, between the positive electrode and the negative electrode. Examples of the separator include, for instance, a porous film of polyethylene, polypropylene or the like, or a nonwoven fabric such as a resin nonwoven fabric or a glass-fiber nonwoven fabric.

The battery may be provided with a battery case that houses the positive electrode, negative electrode, electrolyte layer and so forth. Specific examples of the form of the battery case include, for instance, coin forms, flat-plate forms, tubular forms, laminate forms and the like.

The method for producing an electrode body has a preparation process of preparing a substrate and active material particles having a crystal structure that exhibits highest ion conductivity in a direction perpendicular to a <001> direction; and an electrode body production process of layering a layer including the active material particles onto the substrate while applying a magnetic field in a direction substantially parallel to the substrate, and relatively rotating the direction of the magnetic field with respect to the substrate about an axis that is substantially perpendicular to the substrate, to thereby produce an electrode body in which the substrate has formed thereon an orientation layer configured such that, in a (001) pole figure relating to the active material particles and where a plane parallel to the substrate is defined as the equatorial plane, a Lotgering factor $f_a$(001) of an A plane and a Lotgering factor $f_b$(001) of a B plane satisfy both Expressions (1) and (2) below, the A plane being an equatorial cross section perpendicular to a line that connects the center of the (001) pole figure and a point of maximum XRD intensity of peaks attributed to (001) planes at the outer periphery of the equatorial plane, the B plane being an equatorial cross section perpendicular to a line that connects the center of the (001) pole figure and a point of minimum XRD intensity of peaks attributed to the (001) planes at the outer periphery of the equatorial plane.

$$f_a(001) > 0.3 \quad \text{Expression (1)}$$

$$f_a(001) - f_b(001) < 1.0 \quad \text{Expression (2)}$$

The invention has (1) the preparation process and (2) the electrode body production process. The invention is not necessarily limited to the above two processes alone, and may include processes other than the above two processes, for instance, a heating process or the like. The above processes (1) to (2), as well as other processes, will be explained next in due order.

The starting materials that are prepared in the preparation process are the substrate and the active material particles having a crystal structure that exhibits highest ion conductivity in a direction perpendicular to a <001> direction. The details of the substrate and the active material particles are as described above. Preferably, the substrate does not hamper magnetic orientation of the active material particles. The above-described lithium cobalt oxide (LiCoO$_2$) particles, lithium nickel oxide (LiNiO$_2$) particles, lithium nickel manganese oxide (LiNi$_{1/2}$Mn$_{1/2}$O$_2$) particles and lithium nickel manganese cobalt oxide (LiNi$_{1/3}$Mn$_{1/3}$Co$_{1/3}$O$_2$) particles can be used in the present production method. The active material particles may be mixed as appropriate with water or the like to prepare an active material slurry. A dispersant may be mixed as appropriate into the active material slurry, in order to enhance dispersibility. The active material slurry may be subjected to ultrasonic agitation and vacuum defoaming with a view to forming a uniform orientation layer in the subsequent processes.

The electrode body production process is a process of layering a layer including active material particles onto a substrate, while applying a magnetic field in a direction substantially parallel to the substrate, and relatively rotating the direction of the magnetic field with respect to the substrate, about an axis that is substantially perpendicular to the substrate, to thereby produce an electrode body in which the substrate has formed thereon an orientation layer configured such that, in a (001) pole figure relating to the active material particles and where a plane parallel to the substrate is defined as the equatorial plane, a Lotgering factor $f_a$(001) of an A plane and a Lotgering factor $f_b$(001) of a B plane satisfy both Expressions (1) and (2) above, the A plane being an equatorial cross section perpendicular to a line that connects the center of the (001) pole figure and a point of maximum XRD intensity of peaks attributed to (001) planes at the outer periphery of the equatorial plane, the B plane being an equatorial cross section perpendicular to a line that connects the center of the (001) pole figure and a point of minimum XRD intensity of peaks attributed to the (001) planes at the outer periphery of the equatorial plane.

In the present process, application of a magnetic field onto the substrate, layering of the layer including active material particles, and relative rotation of the magnetic field direction with respect to the bearing of the substrate are carried out simultaneously. The layer including active material particles is converted to an orientation layer by application of a magnetic field. Herein, the feature "applying a magnetic field in a direction substantially parallel to the substrate" indicates that the direction of the magnetic field may deviate somewhat from a direction parallel to the substrate. Specifically, the offset of the direction of the magnetic field with respect to the surface direction of the substrate in the present process may be of 15° or less, preferably 10° or less, more preferably 5° or less, Examples of methods for applying a magnetic field onto the substrate include, for instance, a method that relies on superconducting electromagnets, a method wherein a magnetic field is applied through juxtaposition of powerful magnets such as neodymium magnets, and a method wherein a magnetic field is applied through juxtaposition of electromagnets. In order to apply a magnetic field in a direction parallel to the substrate it suffices to arrange the substrate substantially parallelly to the magnetic field that is formed by the magnets.

The rotation axis in the present process is an axis substantially perpendicular to the substrate. Herein, the feature "substantially perpendicular to the substrate" indicates that the rotation axis may deviate somewhat from the normal of the substrate. Specifically, the offset of the rotation axis with respect to the normal of the substrate in the present process may be of 15' or less, preferably 10' or less, and more preferably 5' or less. The rotation axis need not necessarily run through the layer including active material particles. For instance, the present process encompasses a form wherein a plurality of layers having active material particles is provided at the peripheral edge of a sample stage, and the rotation axis is provided at the center of the sample stage. In the present process, the direction of the magnetic field with respect to the substrate is caused to rotate relatively. Herein, the feature "rotate relatively" indicates that it suffices that the relative rotation speed of the direction of the magnetic field with respect to the substrate be greater than 0. In the present process, therefore, the substrate may be caused to rotate while the direction of the magnetic field is kept constant, or the direction of the magnetic field may be caused to rotate while the bearing of the substrate is kept constant, or the substrate and the direction of the magnetic field may be caused to rotate at mutually dissimilar speeds.

Preferably, the present process is carried out by slipcasting, i.e. in accordance with a method in which the layer including active material particles is spread over the substrate surface. Slip casting can be accomplished in accordance with conventional methods.

The rotation speed of the direction of the magnetic field with respect to the substrate is not particularly limited, provided that it is a speed such that the bearings (<001> direction) of the c-axes of the active material particles are sufficiently random with respect to one another. For instance, the rotation speed ranges preferably from 1 to 100 rpm. The duration of slipcasting is not particularly limited, provided that it is a duration such that the c-axes of the active material particles take on a bearing parallel to the substrate, and such that the bearings of the c-axes of the active material particles become sufficiently random. The duration of slipcasting depends on the size of the electrode body to be produced, but may range, for instance, from about 1 minute to about 48 hours. The substrate may be kept rotating for a while also after the active material particles have stopped being spread on the substrate.

Figure 3A:
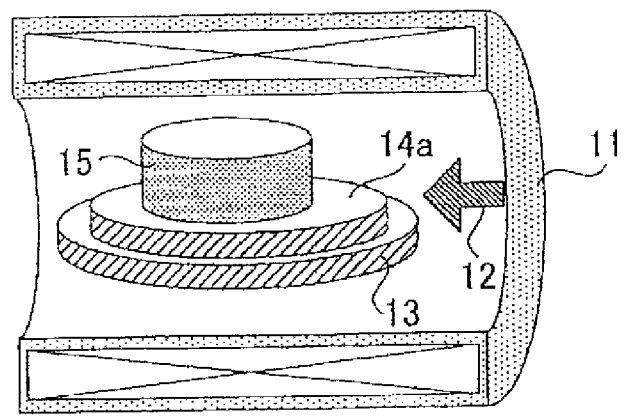
FIG. 3A is a perspective-view schematic diagram illustrating a first embodiment of an electrode body production process, prior to slipcasting.
Figure 3B:
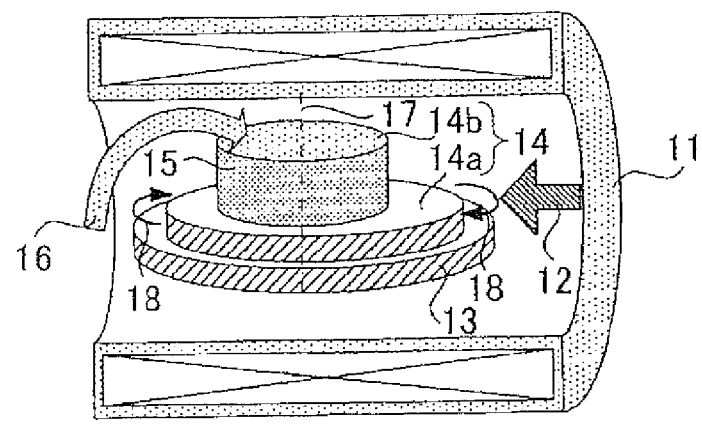
FIG. 3B is a perspective-view schematic diagram illustrating a first embodiment of an electrode body production process, during slipcasting.

FIGS. 3A and 3B are perspective-view schematic diagrams illustrating a first embodiment of an electrode body production process of the invention. FIG. 3A is a perspective-view schematic diagram of a device prior to slipcasting. An electromagnet 11 is designed in such a manner that a magnetic field 12 is generated in the interior of the electromagnet 11, and such that slipcasting can be carried out within the electromagnet 11. For convenience in the drawings and to allow explaining the features within the electromagnet 11, only half of the electromagnet 11 is depicted. A substrate 14a is stationarily disposed on a rotating sample stage 13, and a cylindrical mold 15 is placed on the substrate 14a. The substrate 14a is disposed in such a way so as to be substantially parallel to the direction of the magnetic field 12. FIG. 3B is a perspective-view schematic diagram of the device during slipcasting. The rotating sample stage 13 is caused to rotate, and the bearing of the substrate 14a is also caused to rotate with respect to the direction of the magnetic field, while an active material slurry is poured into the cylindrical mold 15 and a layer including active material particles is layered on the substrate. The arrow 16 denotes schematically the manner in which the active material slurry is poured into the cylindrical mold 15. The dashed line 17 denotes the rotation axis of the substrate 14a. The rotation axis of the substrate 14a is a normal line with respect to the substrate 14a. The arrow 18 denotes the rotation direction of the rotating sample stage 13. The active material slurry is thus spread over the substrate 14a while the substrate 14a is caused to rotate, and an electrode body 14 is produced as a result wherein an orientation layer 14b is formed on the substrate 14a. The active material particles have a crystal structure that exhibits magnetic orientability in the <001> direction, and the direction of the magnetic field 12 is parallel to the substrate 14a at all times. Accordingly, the c-axis directions (<001> direction) of the active material particles are likewise parallel to the substrate 14a. The bearing of the substrate 14a rotates with respect to the direction of the magnetic field 12, and as a result the bearings of the c-axes among active material particles exhibit in-plane randomness. Therefore, the values of the Lotgering factors $f_a(001)$ and $f_b(001)$ in the (001) pole figure in which a plane parallel to the substrate is set to the equatorial plane, for the active material particles in the orientation layer, satisfy the above-described Expressions (1) and (2) at all times.

Figure 4A:
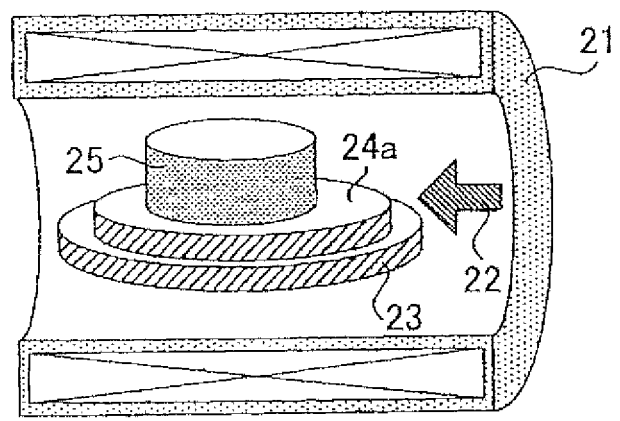
FIG. 4A is a perspective-view schematic diagram illustrating a second embodiment of an electrode body production process, prior to slipcasting.
Figure 4B:
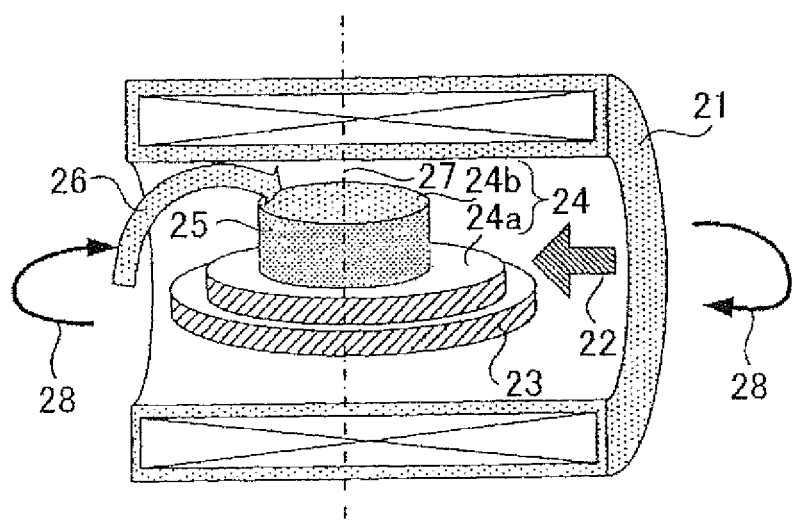
FIG. 4B is a perspective-view schematic diagram illustrating a second embodiment of an electrode body production process, during slipcasting.

FIG. 4A and FIG. 4B are perspective-view schematic diagrams illustrating a second embodiment of the electrode body production process of the invention. FIG. 4A is a perspective-view schematic diagram of a device prior to slipcasting. An electromagnet 21, a magnetic field 22, a rotating sample stage 23, a substrate 24a and a cylindrical mold 25 are identical to those of the first embodiment described above. FIG. 4B is a perspective-view schematic diagram of the device during slipcasting. The entire electromagnet 21 is caused to rotate while an active material slurry is poured into the cylindrical mold 25 and a layer including active material particles is layered on the substrate. In this case, the substrate 24a remains stationary with respect the exterior.

The arrow 26 denotes schematically the manner in which the active material slurry is poured into the cylindrical mold 25. The dashed line 27 denotes the rotation axis of the electromagnet 21. The rotation axis of the electromagnet 21 is a normal line with respect to the substrate 24a. The arrow 28 denotes the rotation direction of the electromagnet 21. Thus, the active material slurry is spread over the substrate 24a while the electromagnet 21 is caused to rotate, so that an electrode body 24 is produced as a result wherein an orientation layer 24b is formed on the substrate 24a. The active material particles have a crystal structure that exhibits magnetic orientability in the <001> direction, and the direction of the magnetic field 22 is parallel to the substrate 24a at all times. Accordingly, the c-axis directions (<001> direction) of the active material particles are likewise parallel to the substrate 24a. The direction of the magnetic field 22 rotates constantly with respect to the substrate 24a, and hence the bearings of the c-axes among active material particles exhibit in-plane randomness. Therefore, the values of the Lotgering factors $f_a(001)$ and $f_b(001)$ in the (001) pole figure in which a plane parallel to the substrate is set to the equatorial plane, for the active material particles in the orientation layer, satisfy the above-described Expressions (1) and (2) at all times.

Figure 5:
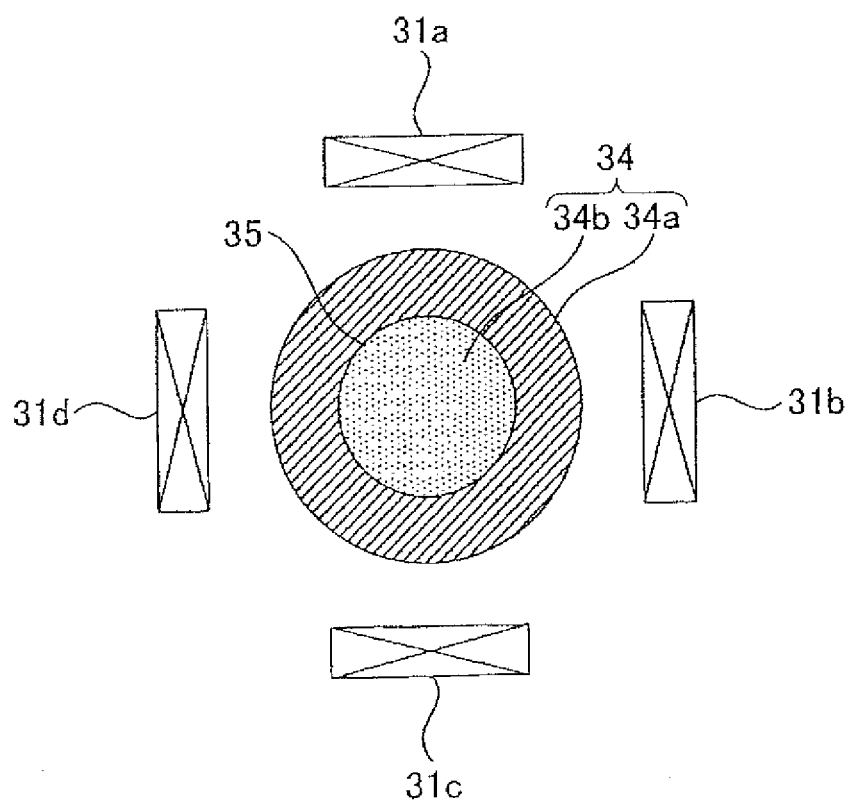
FIG. 5 is a schematic diagram illustrating a third embodiment of an electrode body production process.

FIG. 5 is a schematic diagram illustrating a third embodiment of the electrode body production process of the invention. FIG. 5 illustrates schematically an overhead view of a cylindrical mold 35 on which a substrate 34a is placed, an orientation layer 34b that is formed in the cylindrical mold 35, as well as coils 31a to 31d that surround the substrate 34a, the cylindrical mold 35 and the orientation layer 34b. The electrode body 34 is made up of the substrate 34a and the orientation layer 34b. An active material slurry is poured into the cylindrical mold 35 while the coils are controlled. An example of the control of the coils 31a to 31d is given next. (A-1) Firstly, current is caused to flow in coil 31a and coil 31c in such a manner that the side of coil 31a that faces the electrode body 34 is magnetized to an S-pole, and the side of coil 31c that faces the electrode body 34 is magnetized to an N-pole. (A-2) Next, the current flowing in coil 31a and coil 31c is shut off. (A-3) Next, current is caused to flow in coil 31b and coil 31d in such a manner that the side of coil 31b that faces the electrode body 34 is magnetized to an S-pole, and the side of coil 31d that faces the electrode body 34 is magnetized to an N-pole. (A-4) Next, the current flowing in coil 31b and coil 31d is shut off. (A-5) Next, current is caused to flow in coil 31c and coil 31a in such a manner that the side of coil 31e that faces the electrode body 34 is magnetized to an S-pole, and the side of coil 31a that faces the electrode body 34 is magnetized to an N-pole. (A-6) Next, the current flowing in coil 31c and coil 31a is shut off. (A-7) Next, current is caused to flow in coil 31d and coil 31b in such a manner that the side of coil 31d that faces the electrode body 34 is magnetized to an S-pole, and the side of coil 31b that faces the electrode body 34 is magnetized to an N-pole. (A-8) Next, the current flowing in coil 31d and coil 31b is shut off. Through repetition of the above series of steps (A-1) to (A-8), it becomes possible to elicit a pseudo-rotation of the magnetic field with respect to the horizontal direction of the electrode body 34. Conditions corresponding to the rotation speed can be modified in the third embodiment by varying the current on-off period. The above series of steps (A-1) to (A-8) constitutes an example of a sequence of magnetic orientations and coil energizations, but the third embodiment is not necessarily limited to the series of steps (A-1) to (A-8), and the sequence of magnetic orientations and energizations may be modified. The rotation direction of the magnetic field can be modified by modifying the sequence of magnetic orientations and energizations. It is found that an effect of magnetic field rotation identical to that of the above series of steps (A-1) to (A-8) can also be achieved by performing energization in the order coil 31a, coil 31b, coil 31c, coil 31d. In some instances, however, a sufficient magnetic field parallel to the substrate 34a may fail to be applied through simple energization of coils one by one.

FIG. 6 is a schematic diagram illustrating a fourth embodiment of the electrode body production process of the invention. FIG. 6 illustrates schematically an overhead view of a cylindrical mold 45 on which a substrate 44a is placed, an orientation layer 44b that is formed in the cylindrical mold 45, as well as coils 41a to 41h that surround the substrate 44a, the cylindrical mold 45 and the orientation layer 44b. The electrode body 44 is made up of the substrate 44a and the orientation layer 44b. An active material slurry is poured into the cylindrical mold 45 while the coils are controlled. The number of coils in the fourth embodiment is greater than in the above-described third embodiment. In the fourth embodiment, therefore, a magnetic field can be applied that is closer to a rotating magnetic field than was the case in the third embodiment, Increasing the number of coils makes it possible to apply a magnetic field that simulates a rotating magnetic field, but entails a relatively smaller installation space of the coils, and, accordingly, the magnetic flux density that can be applied to the orientation layer 44b may be lower. Therefore, the number of coils in the fourth embodiment is preferably determined in consideration of the magnetic field intensity that is to be applied. A conceivable example of control of coils 41a to 41h may involve sequentially controlling four sets of opposing coils, by causing current to flow in each coil of one set of opposing coils in such a manner that the sides facing the electrode body 34 take on mutually opposite magnetism, and thereafter shutting the current off, in the same way as in the series of steps (A-1) to (A-8) described above.

An example of a control scheme in which two sets of opposing coils among the coils 41a to 41h are sequentially used at a time is given next. (B-1) Firstly, current is caused to flow in coil 41a, coil 41b, coil 41e and coil 41f in such a manner that the sides of coil 41a and coil 41b that face the electrode body 44 are magnetized to an S-pole, and the sides of coil 41e and coil 41f that face the electrode body 44 are magnetized to an N-pole. (B-2) Next, the current flowing in coil 41a and coil 41e is shut off. Current may be maintained or shut off in coil 41b and coil 41f. (B-3) Next, current is caused to flow in coil 41b, coil 41c, coil 41f and coil 41g, in such a manner that the sides of coil 41b and coil 41c that face the electrode body 44 are magnetized to an S-pole, and the sides of coil 41f and coil 41g that face the electrode body 44 are magnetized to an N-pole. (B-4) Next, the current flowing in coil 41b and coil 41f is shut off. Current may be maintained or shut off in coil 41c and coil 41g. (B-5) Next, current is caused to flow in coil 41c, coil 41d, coil 41g and coil 41h in such a manner that the sides of coil 41c and coil 41d that face the electrode body 44 are magnetized to an S-pole, and the sides of coil 41g and coil 41h that face the electrode body 44 are magnetized to an N-pole, (B-6) Next, the current flowing in coil 41c and coil 41g is shut off. Current may be maintained or shut off in coil 41d and coil 41h. (B-7) Next, current is caused to flow in coil 41d, coil 41e, coil 41h and coil 41a in such a manner that the sides of coil 41d and coil 41c that face the electrode body 44 are magnetized to an S-pole, and the sides of coil 41h and coil 41a that face the electrode body 44 are magnetized to an N-pole. (B-8) Next, the current flowing in coil 41d and coil 41h is shut off. Current may be maintained or shut off in coil 41c and coil 41a. (B-9) to (B-16): steps (B-1) to (B-8) are executed once more with reversed magnetism. Through repetition of the above series of steps (B-1) to (B-16), it becomes possible to elicit a pseudo-rotation of the magnetic field with respect to the horizontal direction of the electrode body 44. Such a method allows increasing the magnetic flux density that can be applied to the orientation layer 44b to a greater degree than when using one set of opposing coils at a time.

An example is given below of a control scheme in which three sets of opposing coils from among coil 41a to 41h are sequentially used at a time. (C-1) Firstly, current is caused to flow in coil 41a to coil 41e and coil 41e to coil 41g, in such a manner that the sides of coil 41a, coil 41b and coil 41c that face the electrode body 44 are magnetized to an S-pole and the sides of coil 41e, coil 41f and coil 41g that face the electrode body 44 are magnetized to an N-pole. (C-2) Next, the current flowing in coil 41a and coil 41e is shut off Current may be maintained or shut off in coil 41b, coil 41c, coil 41f and coil 41g. (C-3) Next, current is caused to flow in coil 41b to coil 41d and coil 41f to coil 41h in such a manner that the sides of coil 41b, coil 41c and coil 41d that face the electrode body 44 are magnetized to an S-pole and the sides of coil 41f, coil 41g and coil 41h that face the electrode body 44 are magnetized to an N-pole. (C-4) Next, the current flowing in coil 41b and coil 41f is shut off. Current may be maintained or shut off in coil 41c, coil 41d, coil 41g and coil 41h. (C-5) Next, current is caused to flow in coil 41c to coil 41e and coil 41g, coil 41h and coil 41a in such a manner that the sides of coil 41c, coil 41d and coil 41e that face the electrode body 44 are magnetized to an S-pole, and the sides of coil 41g, coil 41h and coil 41a that face the electrode body 44 are magnetized to an N-pole. (C-6) Next, the current flowing in coil 41*c* and coil 41*g* is shut off. Current may be maintained or shut off in coil 41*d*, coil 41*e*, coil 41*h* and coil 41*a*. (C-7) Next, current is caused to flow in coil 41*d* to coil 41*f* and coil 41*h*, coil 41*a* and coil 41*b* in such a manner that the sides of coil 41*d*, coil 41*e* and coil 41*f* that face the electrode body 44 are magnetized to an S-pole, and the sides of coil 41*h*, coil 41*a* and coil 41*b* that face the electrode body 44 are magnetized to an N-pole. (C-8) Next, the current flowing in coil 41*d* and coil 41*h* is shut off. Current may be maintained or shut off in coil 41*e*, coil 41*f*, coil 41*a* and coil 41*b*. (C-9) to (C-16): steps (C-1) to (C-8) are executed once more with reversed magnetism. Through repetition of the above series of steps (C-1) to (C-16), it becomes possible to elicit a pseudo-rotation of the magnetic field with respect to the horizontal direction of the electrode body 44. Such a method allows increasing the magnetic flux density that can be applied to the orientation layer 44*b* to a greater degree than when using one set or two sets of opposing coils at a time.

The electrode body production process of the invention is not limited to the first embodiment to fourth embodiment alone.

Preferably, the production method of the invention further has a heating process of heating the electrode body after the above-described electrode body production process. The heating temperature is preferably a temperature that enables sintering of the orientation layer and that allows removing impurities such as a dispersant or the like. The heating temperature can be adjusted as appropriate in accordance with the type of the material (active material particles) that is present in the orientation layer. Preferably, the heating temperature in the present process ranges from 300 to 1500° C. Preferably, the heating time in the present process ranges from 0.5 to 60 hours. Heating may be performed in one stage or over two or more stages.

The production method of the invention may be a method for producing a positive electrode or a negative electrode of a battery, or more specifically, a method for producing a positive electrode or a negative electrode of a lithium battery.

The invention is explained more specifically below based on examples and comparative examples, but the invention is not limited to these examples alone.

1. Production of an Electrode Body

EXAMPLE 1

An active material slurry was prepared by mixing 10 g of $LiCoO_2$ particles, as active material particles, 0.015 g of ammonium polycarboxylate (A6114, by Toa Gosei), as a dispersant, and 8 g of distilled water. The active material slurry was irradiated with ultrasounds for 5 minutes while being stirred using a stirrer, and was vacuum-defoamed.

An alumina porous substrate was prepared as the substrate. Next, a molded body was produced by slipcasting using an apparatus such as the one illustrated in FIG. 3A. Specifically, the alumina porous substrate was set on a rotating sample stage, and a cylindrical mold was placed on the alumina porous substrate, with the opening of the cylinder facing upward. The active material slurry was poured into the cylindrical mold while a 12 T magnetic field was applied in a direction substantially parallel to the surface direction of the alumina porous substrate, and while the rotating sample stage was caused to rotate at 30 rpm about the axis of symmetry of the cylindrical mold, to produce a molded body in which an orientation layer was formed on the alumina porous substrate.

The molded body obtained by slipcasting was baked at 500° C. for 1 hour to remove the dispersant (pre-firing process), and the molded body after pre-firing was set in an alumina crucible lined with $LiCoO_2$ powder, and was fired (final-firing process) at 950° C. for 8 hours, to produce the electrode body of Example 1.

COMPARATIVE EXAMPLE 1

An active material slurry and an alumina porous substrate were prepared in the same way as in Example 1. Next, a cylindrical mold was placed on the alumina porous substrate, with the opening of the cylinder facing upward. The active material slurry was poured into the cylindrical mold, to produce a molded body (slipcasting) in which an active material particle-containing layer was formed on the alumina porous substrate. In Comparative Example 1, thus, the alumina porous substrate was not caused to rotate during molding, and no magnetic field was applied. Thereafter, a pre-firing process and a final-firing process identical to those of Example 1 were carried out to produce the electrode body of Comparative Example 1.

COMPARATIVE EXAMPLE 2

An active material slurry and an alumina porous substrate were prepared in the same way as in Example 1. Next, a molded body was molded by slipcasting using an apparatus such as the one illustrated in FIG. 3A. Specifically, the alumina porous substrate was set on a rotating sample stage, and a cylindrical mold was placed on the alumina porous substrate, with the opening of the cylinder facing upward. The active material slurry was poured into the cylindrical mold while a 12 T magnetic field was applied in a direction substantially parallel to the surface direction of the alumina porous substrate, to produce a molded body in which an orientation layer was formed on the alumina porous substrate. in Comparative Example 2, thus, the rotating sample stage was not caused to rotate during molding. Thereafter, a pre-firing process and a final-firing process identical to those of Example 1 were carried out to produce the electrode body of Comparative Example 2.

2. Evaluation of Electrode Body Orientability

The electrode bodies of Example 1, Comparative Example 1 and Comparative Example 2 were measured by EBSD in which there was measured the orientation of a micro-region on the basis of a Kikuchi pattern obtained by electron beam backscattering, and pole figures were created on the basis of the crystal orientation of the obtained crystal grains.

Figure 13A:
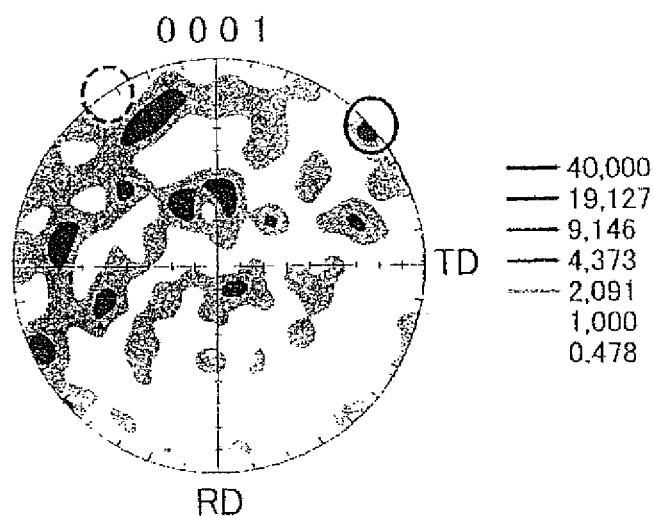
FIG. 13A is a (001) pole figure for an active material particle-containing layer surface of an electrode body of Comparative Example 1, wherein a plane parallel to an alumina porous substrate is defined as the equatorial plane.
Figure 13B:
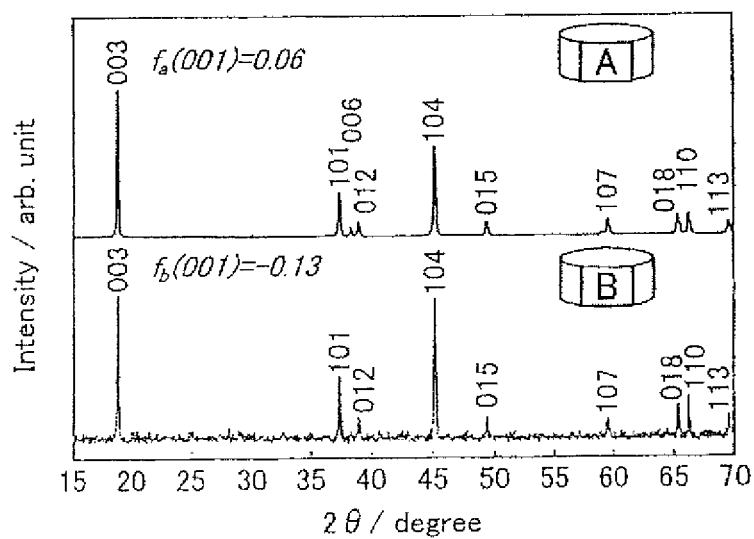
FIG. 13B is a graph diagram in which XRD profiles for an A plane and a B plane in Comparative Example 1 are depicted side by side.

The electrode body of Comparative Example 1 is assessed first. FIG. 13A is a (001) pole figure for the active material particle-containing layer surface of the electrode body of Comparative Example 1, in which a plane parallel to the alumina porous substrate is set to the equatorial plane. The solid-line circle in FIG. 13A denotes the A plane of maximum XRD intensity of peaks attributed to (001) planes at the outer periphery of the equatorial plane, while the broken-line circle denotes the B plane of minimum XRD intensity of the above-mentioned peaks. FIG. 13A shows that the (001) planes are randomly distributed in the active material particle-containing layer of the electrode body of Comparative Example 1. FIG. 13B is a diagram in which XRD profiles for the A plane and for the B plane are depicted side by side. According to FIG. 13B, the Lotgering factor $f_a(001)$ of the A plane is 0.06. The Lotgering factor $f_b(001)$ of the B plane is −0.13. Therefore, $f_a(001) - f_b(001) = 0.06 + 0.13 = 0.19 < 1.0$, and hence the electrode body of Comparative Example 1 satisfies the above-described Expression (2). This indicates that the orientability among the c-axes of $LiCoO_2$ particles in the active material particle-containing layer of the electrode body of Comparative Example 1 is a random one. However, $f_a(001)=0.06<0.3$, and hence the electrode body of Comparative Example 1 does not satisfy the above-described Expression (1). This indicates that the c-axes of $LiCoO_2$ particles in the active material particle-containing layer of the electrode body of Comparative Example 1 are not parallel to the substrate. From the above, it follows that the directions of expansion and contraction of $LiCoO_2$ particles derived from entry and exit of lithium in the electrode body of Comparative Example 1 are random directions, but the directions of high lithium conductivity of the $LiCoO_2$ particles are not perpendicular to the substrate.

Figure 14A:
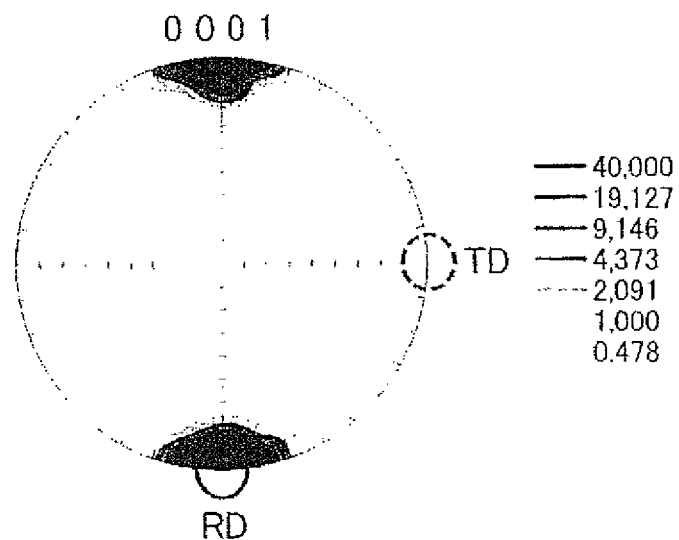
FIG. 14A is a (001) pole figure for an orientation layer surface of an electrode body in Comparative Example 2, wherein a plane parallel to an alumina porous substrate is defined as the equatorial plane.
Figure 14B:
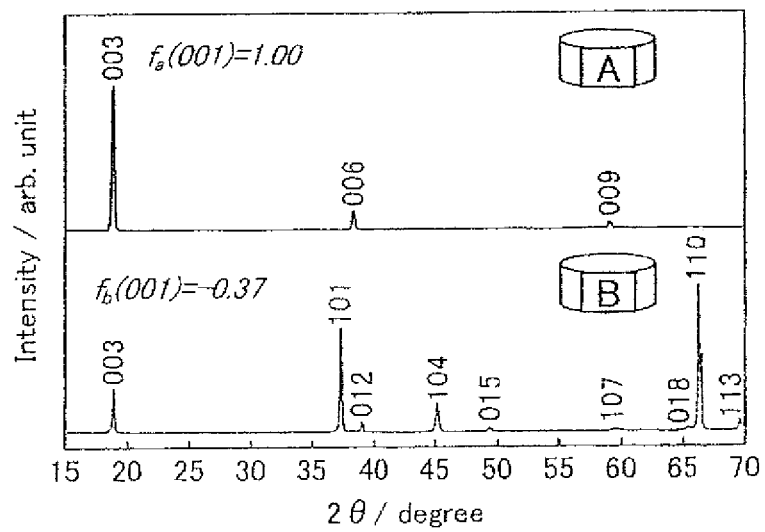
FIG. 14B is a graph diagram in which XRD profiles for an A plane and a B plane in Comparative Example 2 are depicted side by side.

The electrode body of Comparative Example 2 is assessed next. FIG. 14A is a (001) pole figure for the orientation layer surface of the electrode body of Comparative Example 2, in which a plane parallel to the alumina porous substrate is set to the equatorial plane. The solid-line circle in FIG. 14A denotes the A plane of maximum XRD intensity of peaks attributed to (001) planes at the outer periphery of the equatorial plane, while the broken-line circle denotes the B plane of minimum XRD intensity of the abovementioned peaks. FIG. 14A shows that the (001) planes for the orientation layer in the electrode body of Comparative Example 2 are concentrated at both poles of the RD-axis in the pole figure. FIG. 14B is a diagram in which XRD profiles for the A plane and for the B plane are depicted side by side. According to FIG. 14B, the Lotgering factor $f_a(001)$ of the A plane is 1.00. Therefore, $f_a(001)=1.00>0.3$, and hence the electrode body of Comparative Example 2 satisfies the above-described Expression (1). This indicates that the c-axes of the $LiCoO_2$ particles in the orientation layer of the electrode body of Comparative Example 2 are oriented parallelly to the substrate, However, the Lotgering factor $f_b(001)$ of the B plane is $-0.37$, so that $f_a(001)-f_b(001)=1.00-(-0.37)=1.37>1.0$, and hence the electrode body of Comparative Example 2 does not satisfy the above-described Expression (2). This indicates that the c-axes of the $LiCoO_2$ particles in the orientation layer of the electrode body of Comparative Example 2 are mutually aligned in the RD-axis direction, i.e. in the direction in which the magnetic field is applied. From the above, it follows that in the electrode body of Comparative Example 2 the directions of high lithium conductivity of the $LiCoO_2$ particles are aligned perpendicularly the substrate, and that the directions of expansion and contraction of the $LiCoO_2$ particles derived from lithium entry and exit are likewise aligned.

Figure 7A:
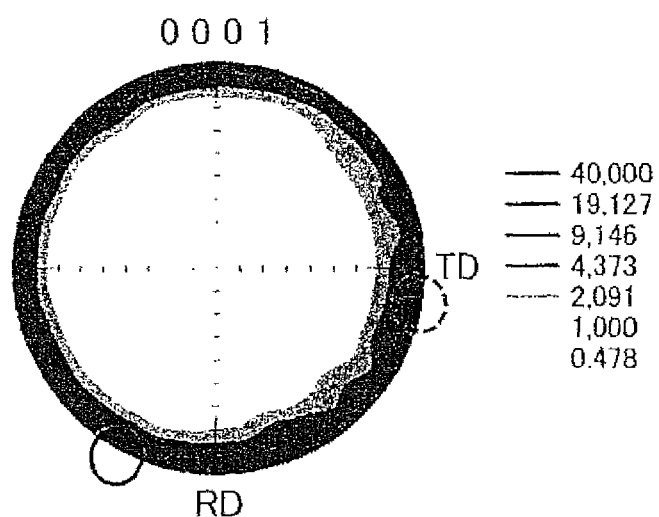
FIG. 7A is a (001) pole figure for an orientation layer surface of an electrode body of Example 1, wherein a plane parallel to an alumina porous substrate is defined as the equatorial plane.
Figure 7B:
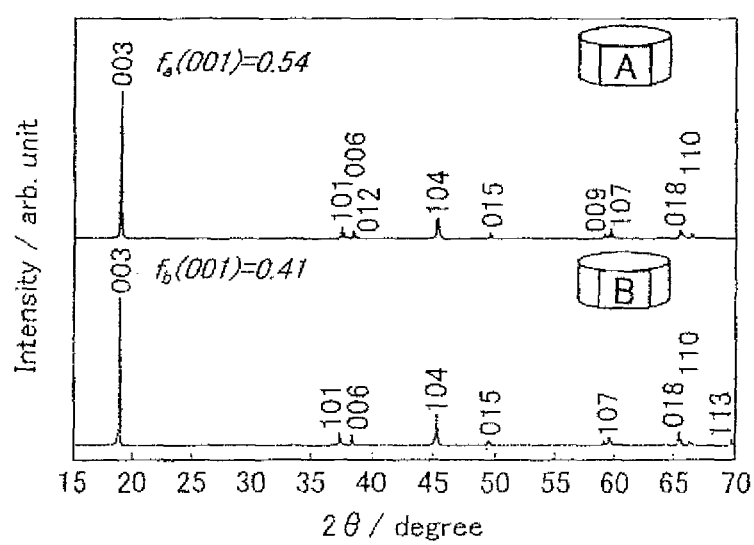
FIG. 7B is a graph diagram in which XRD profiles for an A plane and a B plane in Example 1 are depicted side by side.

The electrode body of Example 1 is explained next. FIG. 7A is a (001) pole figure for the orientation layer surface of the electrode body in Example 1, in which a plane parallel to the alumina porous substrate is set to the equatorial plane. The solid-line circle in FIG. 7A denotes the A plane of maximum XRD intensity of peaks attributed to (001) planes at the outer periphery of the equatorial plane, while the broken-line circle denotes the B plane of minimum XRD intensity of the abovementioned peaks. FIG. 7A shows that in the electrode body surface of Example 1 the (001) planes are distributed substantially uniformly over the outer periphery of the equatorial plane of the pole figure. FIG. 7B is a diagram in which XRD profiles for the A plane and for the B plane are depicted side by side. According to FIG. 7B, the Lotgering factor $f_a(001)$ of the A plane is 0.54. Therefore, $f_a(001)=0.54>0.3$, and hence the electrode body of Example 1 satisfies the above-described Expression (1). This indicates that the c-axes of the $LiCoO_2$ particle particles in the orientation layer of the electrode body of Example 1 are oriented parallelly to the substrate. The Lotgering factor $f_b(001)$ of the B plane is 0.41, so that $f_a(001)-f_b(001)=0.54-0.41=0.13<1.0$, and hence the electrode body of Example 1 satisfies the above-described Expression (2). This indicates that the orientability among c-axes in the $LiCoO_2$ particles in the orientation layer of the electrode body of Example 1 is a random one. From the above, it follows that although in the electrode body of Example 1 directions of high lithium conductivity of the $LiCoO_2$ particle are aligned perpendicularly to the substrate, the directions of expansion and contraction of the $LiCoO_2$ particles derived from lithium entry and exit are random directions.

3. Production of a Lithium Battery

EXAMPLE 2

The electrode body of Example 1 was appropriately cut using a diamond cutter, and was polished down to a thickness of about 130 µm. Platinum was vapor-deposited, as an electrode collector, on one face of the polished electrode body, to produce a positive electrode. Metallic lithium was prepared as the negative electrode. An electrolyte solution resulting from dissolving $LiPF_6$, as a supporting salt, to a concentration of 1 mol/L in a solvent resulting from mixing ethylene carbonate (EC) and dimethyl carbonate (DMC) at a volume ratio EC:DMC=1:1, was used as the electrolyte layer. The electrolyte solution layer was sandwiched between the positive electrode and the negative electrode, to produce the lithium battery of Example 2.

COMPARATIVE EXAMPLE 3

The electrode body of Comparative Example 1 was appropriately cut using a diamond cutter, and was polished down to a thickness of about 130 µm. Platinum was vapor-deposited, as an electrode collector, on one face of the polished electrode body, to produce a positive electrode. Thereafter, a lithium battery of Comparative Example 3 was produced using the same negative electrode and electrolyte layer as in Example 2.

COMPARATIVE EXAMPLE 4

The electrode body of Comparative Example 2 was appropriately cut using a diamond cutter, and was polished down to a thickness of about 130 µm. Platinum was vapor-deposited, as an electrode collector, on one face of the polished electrode body, to produce a positive electrode. Thereafter, a lithium battery of Comparative Example 4 was produced using the same negative electrode and electrolyte layer as in Example 2.

4. Charge and Discharge Experiments

The lithium batteries of Example 2, Comparative Example 3 and Comparative Example 4 were subjected to a charge and discharge experiment. Specifically, each lithium battery was CC charged at a current of 0.4 mA up to 4.2 V, and, after a 10-minute pause, was CC discharged at 4 mA down to 2.5 V.

Figure 8:
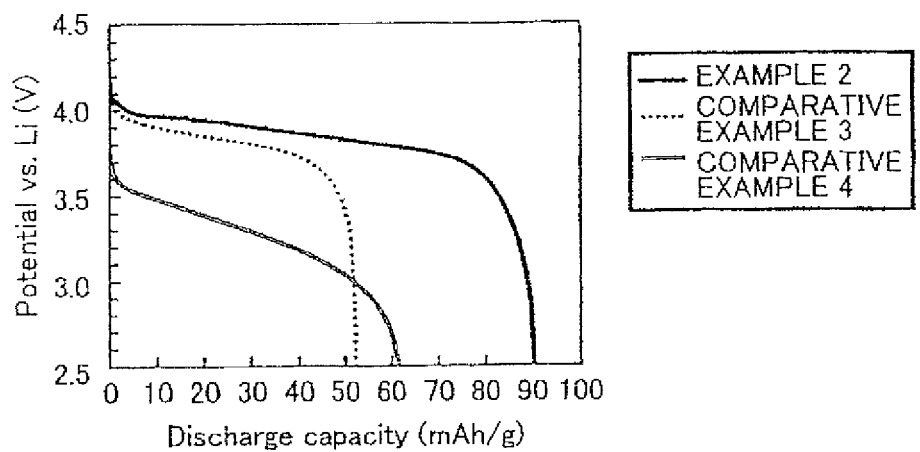
FIG. 8 is a graph illustrating overlapping discharge curves of lithium batteries of Example 2, Comparative Example 3 and Comparative Example 4.

FIG. 8 is a graph illustrating overlapping discharge curves of the lithium batteries of Example 2, Comparative Example 3 and Comparative Example 4. The heavy-line graph in FIG. 8 denotes the discharge curve of Example 2, the broken-line graph denotes the discharge curve of Comparative Example 3, and the double-line graph denotes the discharge curve of Comparative Example 4. The discharge capacity of the lithium battery of Comparative Example 3, according to the graph of Comparative Example 3 in FIG. 8, is 52 mAh/g. Therefore, the lithium battery of Comparative Example 3, which utilizes an electrode body fired without control of the orientation of the active material particles (Comparative Example 1), exhibits very low discharge capacity. The discharge capacity of the lithium battery of Comparative Example 4, according to the graph. of Comparative Example 4 in FIG. 8, is 62 mAh/g. This result indicates that although the discharge capacity is higher than that of the lithium battery of Comparative Example 3, the IR drop (voltage drop) in the graph of Comparative Example 4 is more substantial, as can be seen in FIG. 8. Therefore, it is found that the IR drop is greater in the lithium battery of Comparative Example 4 that utilizes an electrode body (Comparative Example 2) in which directions of high conductivity of lithium ions are rendered substantially perpendicular to the substrate and the directions of expansion and contraction of active material particles are oriented in a given direction substantially parallel to the substrate Through control of the alignment of the crystal orientation of the active material particles in the orientation layer. It is deemed that when the orientation directions of the active material particles are aligned, the active material particles expand and contract all in the same direction upon expansion and contraction of the particles. Such mutual expansion and contraction has the effect of limiting expansion and contraction of adjacent active material particles. This limitation in the expansion and contraction of the active material particles exerts presumably an adverse effect on the conductivity of lithium ions that enter and leave the active material particles, which in turn results in a significant IR drop. Other than lithium ion conduction, however, electron conduction may also conceivably be the underlying cause of the IR drop. Therefore, the above speculation relating to the JR drop in Comparative Example 4 covers just one cause. Thus IR drops mediated by electron conduction or other causes cannot be ruled out.

The discharge capacity of the lithium battery of Example 2, according to the graph of Example 2 in FIG. 8, is 90 mAh/g. This result shows 1.7-fold the discharge capacity of a conventional lithium battery (Comparative Example 3). The IR drop in the graph of Example 2 is smaller than that in the Comparative Example 4. Therefore, it is found that very high discharge performance is delivered by the lithium battery of Example 2, which utilizes an electrode body in which the directions of high conductivity of lithium ions are rendered substantially perpendicular to the substrate, and the directions of expansion and contraction of the active material particles are made random, through control of the alignment of the crystal orientation of the active material particles in the orientation layer (Example 1).

What is claimed is:

1. An electrode body, comprising:
   a substrate; and
   an orientation layer that is provided on at least one surface of the substrate, and includes active material particles having a crystal structure exhibiting highest ion conductivity in a direction perpendicular to a <001> direction, wherein:
   in a (001) pole figure of the active material particles, where a plane parallel to the substrate is defined as an equatorial plane, a Lotgering factor $f_a(001)$ of an A plane and a Lotgering factor $f_b(001)$ of a B plane satisfy both Expressions (1) and (2) below, the A plane being an equatorial cross section perpendicular to a line that connects a center of the (001) pole figure and a first point of maximum XRD intensity of peaks attributed to (001) planes at an outer periphery of the equatorial plane, the B plane being an equatorial cross section perpendicular to a line that connects the center of the (001) pole figure and a second point of minimum XRD intensity of peaks attributed to the (001) planes at the outer periphery of the equatorial plane:

$$f_a(001) > 0.3 \quad \text{Expression (1)}$$

$$f_a(001) - f_b(001) < 1.0 \quad \text{Expression (2).}$$

2. The electrode body according to claim 1, wherein the active material particles are at least one type of active material particles selected from the group consisting of lithium cobalt oxide ($LiCoO_2$) particles, lithium nickel oxide ($LiNiO_2$) particles, lithium nickel manganese oxide ($LiNi_{1/2}Mn_{1/2}O_2$) particles and lithium nickel manganese cobalt oxide ($LiNi_{1/3}Mn_{1/3}Co_{1/3}O_2$) particles.

3. The electrode body according to claim 1, wherein
   the electrode body is a positive electrode or negative electrode of a lithium battery.

4. A battery, comprising:
   a positive electrode;
   a negative electrode; and
   an electrolyte layer interposed between the positive electrode and the negative electrode,
   wherein at lest either one of the positive electrode and the negative electrode is provided with the electrode body according to claim 1.

5. A method for producing an electrode body, comprising:
   preparing a substrate and active material particles having a crystal structure that exhibits highest ion conductivity in a direction perpendicular to a <001> direction; and
   layering a layer including the active material particles onto the substrate while applying a magnetic field in a direction substantially parallel to the substrate, and relatively rotating the direction of the magnetic field with respect to the substrate about an axis that is substantially perpendicular to the substrate, to thereby produce an electrode body in which the substrate has formed thereon an orientation layer configured such that, in a (001) pole figure relating to the active material particles, where a plane parallel to the substrate is defined as an equatorial plane, a Lotgering factor $f_a(001)$ of an A plane and a Lotgering factor $f_b(001)$ of a B plane satisfy both Expressions (1) and (2) below, the A plane being an equatorial cross section perpendicular to a line that connects a center of the (001) pole figure and a first point of maximum XRD intensity of peaks attributed to (001) planes at an outer periphery of the equatorial plane, the B plane being an equatorial cross section perpendicular to a line that connects the center of the (001) pole figure and a second point of minimum XRD intensity of peaks attributed to the (001) planes at the outer periphery of the equatorial plane:

$$f_a(001) > 0.3 \quad \text{Expression (1)}$$

$$f_a(001) - f_b(001) < 1.0 \quad \text{Expression (2).}$$

6. The method for producing an electrode body according to claim 5, wherein the electrode body is heated after being produced.

7. The method for producing an electrode body according to claim 5, wherein the electrode body is produced by slip-casting.

8. The method for producing an electrode body according to claim 5, wherein the electrode body is a positive electrode or negative electrode of a lithium battery.

* * * * *